CONTROL TERMINAL FOR MOBILE RADIO TELEPHONE

Filed Dec. 18, 1948 9 Sheets-Sheet 1

INVENTOR.
Everhard H. B. Bartelink.
BY Ward, Crosby & Neal
ATTORNEYS.

Nov. 20, 1951 E. H. B. BARTELINK 2,575,782

CONTROL TERMINAL FOR MOBILE RADIO TELEPHONE

Filed Dec. 18, 1948 9 Sheets-Sheet 2

INVENTOR.
EVERHARD H. B. BARTELINK,
BY
Ward, Crosby & Neal
ATTORNEYS.

Nov. 20, 1951 E. H. B. BARTELINK 2,575,782

CONTROL TERMINAL FOR MOBILE RADIO TELEPHONE

Filed Dec. 18, 1948 9 Sheets-Sheet 3

INVENTOR.
EVERHARD H. B BARTELINK.
BY
ATTORNEYS.

CONTROL TERMINAL FOR MOBILE RADIO TELEPHONE

Filed Dec. 18, 1948 9 Sheets-Sheet 4

INVENTOR.
EVERHARD H.B. BARTELINK.
BY
Ward, Crosby & Neal
ATTORNEYS.

CONTROL TERMINAL FOR MOBILE RADIO TELEPHONE

INVENTOR.
EVERHARD H. B. BARTELINK.

Ward, Crosby & Neal
ATTORNEYS.

CONTROL TERMINAL FOR MOBILE RADIO TELEPHONE

Filed Dec. 18, 1948 9 Sheets-Sheet 6

INVENTOR.
EVERHARD H. B. BARTELINK.
BY
Ward, Crosby & Neal
ATTORNEYS.

Nov. 20, 1951 E. H. B. BARTELINK 2,575,782

CONTROL TERMINAL FOR MOBILE RADIO TELEPHONE

Filed Dec. 18, 1948 9 Sheets-Sheet 7

INVENTOR.
EVERHARD H. B. BARTELINK.
BY
Ward, Crosby & Neal
ATTORNEYS.

INVENTOR.
EVERHARD H. B. BARTELINK.
BY Ward, Crosby & Neal
ATTORNEYS.

Nov. 20, 1951 E. H. B. BARTELINK 2,575,782

CONTROL TERMINAL FOR MOBILE RADIO TELEPHONE

Filed Dec. 18, 1948 9 Sheets-Sheet 9

*INVENTOR.*
EVERHARD H. B. BARTELINK.
*BY* Ward, Crosby & Neal.
*ATTORNEYS.*

Patented Nov. 20, 1951 2,575,782

UNITED STATES PATENT OFFICE 2,575,782

CONTROL TERMINAL FOR MOBILE RADIO TELEPHONE

Everhard H. B. Bartelink, Bronxville, N. Y., assignor, by mesne assignments, to Automatic Electric Laboratories, Inc., Chicago, Ill., a corporation of Delaware Application December 18, 1948, Serial No. 66,010

17 Claims. (Cl. 250—6)

This invention pertains to mobile radio telephone systems in which a multiplicity of mobile subscribers' telephone stations are linked by radio to "land-based," i. e. permanently located, radio transmitting and receiving stations, which latter are connected over land-based wire lines, i. e. metallic circuits, to a control terminal, and thence to a central office or toll switchboard, whereby the mobile stations may communicate with land-based subscribers' stations and also with each other.

The present invention pertains more particularly to the control terminal and appurtenant portions of such a system, including the circuits from the control terminal to the central office and the land-lines extending between the control terminal and the land-based radio transmitting and receiving stations, and provides equipment for such purposes, of a new design characterized by various novel features of circuit arrangement and operation, described in detail hereinafter.

This application is a continuation-in-part of my co-pending application on the same subject, Serial No. 741,289, filed August 14, 1947, now forfeited.

The broad purpose of a mobile radio telephone system is to extend telephone service to subscribers' stations located on mobile units such as trains, planes, automobiles, ships, etc., and thereby enable occupants therein to communicate by radio with the central office, and thence over land-based facilities with any land-based subscriber served by such facilities, or by radio with other mobile stations. To this end, the mobile stations are provided with radio transmitter and receiver units; and preferably also with station selectors responsive to dialing pulses, whereby the central office operator may dial any mobile station desired. Station selector circuits appropriate for this purpose are described in my co-pending applications Serial No. 729,828, filed February 20, 1947, now abandoned, and Serial No. 20,719, filed April 13, 1948, now Patent No. 2,478,361.

The control terminal serves the functions of connecting the land-based radio transmitter and receiver units of a mobile radio telephone system with each other and with the central office switchboard, and of providing the necessary supervision signals for the switchboard operator at the central office, and also for the technical operator at the control terminal. In addition it permits the technical operator at the control terminal to test and operate the entire system.

To this end, the control terminal is connected over a two-conductor wire circuit with a land-based main transmitter, of sufficient power output to serve all mobile stations throughout a preselected area. The radio transmitters of the mobile subscribers' stations are much lower in power output in order to be economical. Thus their range is smaller than that of the main transmitter coverage. Accordingly, a number of land-based radio receivers are ordinarily provided which are connected over two-conductor, wire lines to the control terminal, these land-based receivers being strategically located throughout the service area in such arrangement that at least one such receiver will always be within easy transmitting range of a mobile station, irrespective of the latter's particular location in the service area.

The control terminal comprises a control panel which interconnects all units aforesaid and controls their functions, viz., land-based transmitter and receiver units and the central office, and additionally comprises to this end, at least one land-based radio transmitter line panel and at least one land-based radio receiver line panel, together with a limiting amplifier panel which also contains a transfer relay for disconnecting the limiting amplifier during dialing, and also one or more tone oscillators, which generate the dial tones, together with pulsing relays which modulate or interrupt the same under control of the dialing equipment at the central office and at a technical operator's position on the control terminal.

The control terminal is also equipped with special switches which permit the technical operator to disconnect completely the circuits into the central office switchboard, and himself to perform, at the control terminal, all the functions normally performed by the switchboard operator at the central office. A loud speaker provided in the control terminal permits the technical operator to monitor all transmissions whether they are controlled from the switchboard or from the control terminal.

It is desirable that a reasonably constant modulation level be applied to the land-based radio transmitter, and, to this end, the control terminal contains the above mentioned limiting amplifier which is connected in the outgoing metallic circuit to the land-based transmitter. The incoming metallic circuits from the land-based receivers are also connected to the input of the limiting amplifier to provide for intercommunication between mobile stations.

The transmitter and receiver line panels include attenuators for setting the proper transmission levels outgoing to and incoming from the land-based transmitter and receiver units, and are further equipped to transmit supervision signals to and from the land-based transmitter and receiver units. Patching and monitoring jacks are also provided in these units, which are equipped with pilot lamps to indicate when the outgoing carrier of the land-based transmitter is switched on, and when incoming carrier is being received by one of the land-based receiving units. In the case of the land-based receivers, facilities are provided on the receiver line panel at the control terminal, for complete switchover from a normally used land-based receiver to a "stand by" receiver. If more than one land-based receiver is normally employed, as is ordinarily the case, a corresponding number of receiver line panels are provided at the control terminal; and, in this case, these panels are equipped to provide an extremely simple type of signal-to-noise ratio selections between the various land-based receivers.

An off-frequency alarm is provided at the control terminal and at the central office operator's switchboard position, which will alert the central office and technical operators, whenever the land-based radio transmitter is not operating on the proper frequency. Separate provisions in the control terminal permit the addition of an "east-west" busy indication where the mobile system operates as part of a chain of highway stations having overlapping coverages.

The control terminal of the invention performs in general the following functions: On incoming calls this unit will light a call lamp at the central office switchboard operator's position, to alert the switchboard operator as soon as a mobile subscriber has lifted his handset and pressed his push-to-talk button. When the operator answers the call by inserting her cord plug into the switchboard jack over which the call is incoming, the call lamp is extinguished and a busy lamp lighted, which remains lighted as long as the operator's cord is inserted.

On outgoing calls, the control terminal will connect a tone oscillator to the land-based radio transmitter, as soon as the central office operator has inserted her cord plug into the appropriate switchboard jack. Circuits are then provided which will permit the operator to dial mobile units equipped with selective calling systems, by means of her regular switchboard dialing equipment. In this connection the control terminal of the invention is designed to permit the dialing into mobile units equipped with either the well known Western Electric 106A type of selector system, and also the dialing of mobile units equipped with selector systems in accordance with those of my co-pending applications Serial Nos. 729,828 and 20,719 aforesaid. The control terminal of the invention will maintain the dial tone connected to the land-based radio transmitter for a short period after the last digit has been dialed, in order to provide ringing in the mobile unit. The busy lamp is lighted on outgoing calls as soon as the operator has plugged her cord into the switchboard jack, and remains lighted as long as her cord plug is thus inserted.

Disconnect signals are obtained from the wire line subscribers' circuit on calls between mobile and wire line stations, and appear in normal fashion in the operator's cord circuit as soon as the wire line subscriber hangs up.

The control terminal of the invention is also arranged to provide for conversations between mobile units. In such cases the operator upon receiving the number of the desired station to be called, must remove her cord circuit plug from the mobile service jack, and reinsert the same, and thereupon dial the desired mobile unit number as soon as the calling party has released the "push-to-talk" button. When the called party answers, the operator will notify both parties to proceed with their conversation.

The system of the invention is characterized by the following features: Whenever the operator originates a call, a dial tone is applied to the line. Whenever an operator answers a call, no dial tone is applied. The dial tone persists for an adjustable period of time after the operator plugs in a cord. This period is called the tone-delay period. If dial pulses are transmitted, the tone delay is rejuvenated on every pulse so that the dial tone persists for the tone-delay period after the last dial pulse of any dial operation. The transmitter is under the control of a slow-acting relay and remains energized during the dial pulses. The transmitter relay is controlled by one of the dial loop supervision relay contacts. Incoming calls lock up the line relay, which keeps the line lamp lighted until both the transmitter and the monitor- receiver relay have operated.

Tone delays are obtained by means of a vibrating relay, or other delay relay, which in turn keeps a "super-slow relay" energized. The latter can be a regular slow-release relay. The vibrating or other delay relay can only be energized when the line relay is unenergized, the monitor relay is in the "system idle position," and the dial loop supervision relay energized. Once the vibrating or other delay relay is energized and has in turn energized the "super-slow" relay, a new energizing circuit is formed through a spacing contact of the line relay, a contact on the monitor relay which is made when the main transmitter is in operation, and a contact on the loop supervision relay which is made when the loop is interrupted by dial pulses.

For resetting some selectors, such as the Western Electric Company's type 106A, two extra relays are provided which cause a short interruption in the ground lead controlling the tone oscillator shortly after it has been energized and shortly before the transfer relay releases.

The tone oscillator is controlled by a contact in the dial loop supervision relay. Application of ground to this lead applies the tone, and interruptions of this ground lead interrupts the tone for mobile units equipped with station selectors in accordance with my applications aforesaid; while application of ground switches in tone, and interruption of ground switches the tone oscillator to another frequency for mobile stations equipped with other types of selector systems such as the Western Electric Company's 106A. The super-slow relay applies ground to a lead controlling the transfer relay which transfers the voice circuit leading to the transmitter from the receiver and line circuits to the tone oscillator output. Simultaneously, this transfer relay applies the tone to the line circuit through an attenuator to give "start dialing" supervision to the central office operator.

More than one tone oscillator can be controlled by this control panel, provided two different jacks are installed on the switchboard and connected in such a way that insertion of a cord in one jack operates a relay, transferring the system from one tone oscillator to the other.

In the drawings:

Figure 1 is a block diagram layout of a mobile radio telephone system of the character to which the present invention is applicable, this figure illustrating the circuits and apparatus employed for establishing a connection from a mobile subscribers' station to a land-based subscribers' station; while Figure 2 is a diagrammatic layout of the essential components of a mobile subscribers' telephone station.

Figure 3 shows the basic circuit arrangement of the line termination panel which, when wired in accordance with the various options A to D inc., illustrated in Figure 4, and option E illustrated in Figure 8, is employed to terminate both the control terminal and the distant ends of the two-wire metallic circuit which extends from the control terminal to the remote land-based radio transmitter, and which is also employed to terminate both the control terminal and distant ends of each of the two-wire metallic circuits extending from the control terminal to each of the remote, land-based radio receivers of the mobile radio system. Figure 4 illustrates the option board on which the wiring connections for the various options aforesaid are made, and further illustrates the wiring connections for options A to D aforesaid, while Figure 8 shows a further option E as referred to below.

Figure 5 is a wiring diagram of the two-wire metallic circuit extending from the control terminal to the remote land-based radio transmitter, including the line termination panels at each end thereof, as wired respectively in accordance with options B and D of Figure 4.

Figure 6 is a wiring diagram of the two-wire metallic circuit extending from the control terminal to a remote, land-based radio receiver including the line termination panels at the control terminal and distant ends thereof as units are connectible to an antenna 18 through contacts of a relay 19, actuatable by a handset "push-to-talk" button 20, thereby to switch the antenna 18 from the receiver input to the transmitter output.

The mobile station is linked by radio, as indicated at 21, 22 to a land-based transmitter T, and land-based receivers, such as R-1, R-2, R-3, etc. As stated, the land-based transmitter T is sufficiently powerful to serve all mobile stations within a preselected service area. On the other hand, the mobile station transmitters such as 12, are of much lower power output in order to be economical. Accordingly, a multiplicity of land-based receivers are strategically located throughout the service area, so that at least one of them, such as R-1, R-2, R-3, etc., in the drawing, will be within easy transmitting range of the mobile station MS, irrespective of its location in the service area.

The land-based transmitter T and receivers R-1, R-2, R-3, etc., are connected over wire circuits such as 23 to 26 inc., to a control terminal 27, where they are connected in the manner above referred to and as indicated at 28 over a wire circuit 29 to a toll switchboard 30, from whence a connection may be completed from the mobile station to a land-based subscribers' station, such as 31, over a toll line circuit 32 and through a central office 33, to which the land-based subscribers' station 31 is permanently connected.

Each land-based receiver R-1, R-2, etc., is provided with a carrier current actuated relay C, commonly referred to as a Codan relay, at least one of which, i. e., that nearest the mobile station MS, will be actuated upon receipt of incoming carrier 22 therefrom, thereby to actuate a call lamp wired respectively in accordance with Options A and C of Figure 4.

Figure 7 is a wiring diagram of the control terminal end of land-based radio receiver circuits, employed where a plurality of land-based radio receivers are required; while Figure 8 illustrates modified wiring connections required on the option board of Figure 4 in conjunction with those on certain terminals of the receiver line panel, for providing the circuit arrangement of Figure 7, the Figure 8 wiring connections being referred to herein as option E, as above noted.

Figures 9 and 10 show the wiring diagram for the overall system layout including the control terminal and circuits and apparatus appurtenant thereto, including the tone oscillators, central office switchboard, limiting amplifier and the land-based transmitter and receiver line panels at the control terminal ends of the circuits extending to the remote land-based transmitter and also to the remote land-based receivers.

Figure 11 is the wiring diagram of the limiting amplifier above referred to; while Figure 11*a* illustrates graphically the input versus output gain characteristics thereof.

Figures 1, 2:
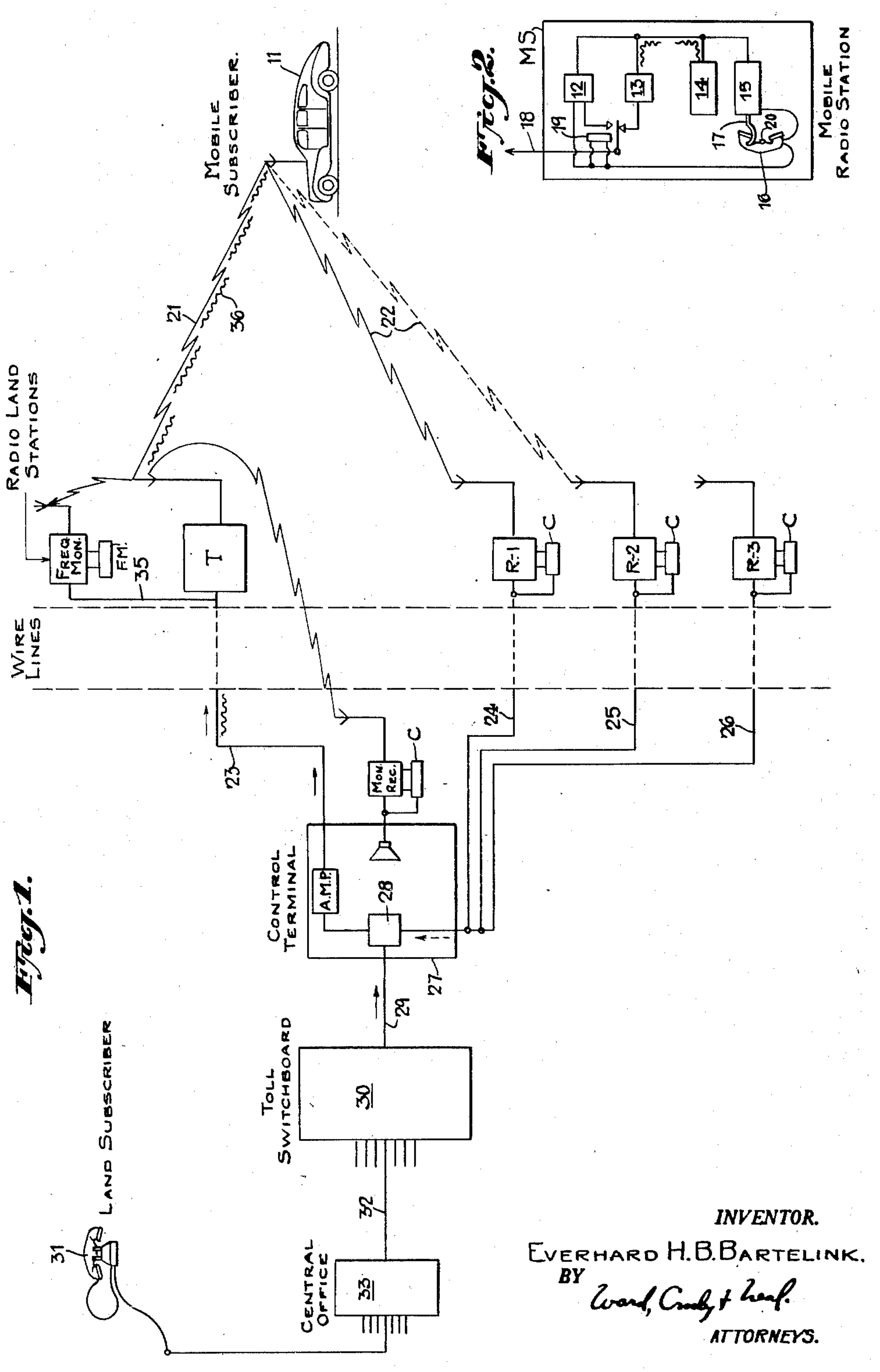

Referring to the block diagram layout of Figs. 1 and 2, there is shown at the right a mobile subscribers' station MS, mounted in a mobile unit such as an automobile 11. The mobile station comprises a radio transmitter 12, a radio receiver 13 and a station selector 14, connected through a control panel 15 to a handset 16, normally resting on a switch hook 17. The radio transmitter and receiver at the technical operator's position, i. e., at the control terminal 27, and also at the central office operator's position on the switchboard 30, as explained below. Some of the outgoing carrier from the land-based transmitter T is transmitted to the adjacent frequency monitor 34, which signals the control terminal over connection 35, and also the toll switchboard, and operates alarm lamp thereat, and also, if desired, a bell or buzzer, whenever the outgoing carrier from transmitter T is operating "off frequency," as explained below.

On calls outgoing from the central office to a mobile subscribers' station, the outgoing carrier 21 from transmitter T is modulated with dialing signals, as indicated at 36, to actuate the station selector 14 at the desired mobile station, and thereupon to energize suitable signaling devices, lamps, buzzers, bells, etc., at the called station, as is fully disclosed in my aforesaid copending applications Serial Nos. 729,828 and 20,719.

Before turning to a detailed description of the overall operation of the system, with reference to the wiring diagrams thereof, certain components thereof will first be described, as this will facilitate comprehension of the overall operation. Accordingly, discussion will first be had as to the construction and operation of the wire circuits extending from the control terminal to the remote land-based transmitter and to the remote land-based receiver or receiver units.

The general functions of these circuits are as follows: The lines between the central office and the remote transmitter or land receivers are required to transmit voice-frequency signals in one direction, as well as direct current supervision signals in both directions. In the case of the land-based transmitter, a direct current signal must be transmitted thereto in order to switch the transmitter on and off, and a direct current signal must be received therefrom at the control terminal in order to relay the indications of the frequency monitor into the control terminal. In the case of the land-based receivers, the operations of the Codan relay thereat must be transmitted to the control terminal over a direct current circuit. Also, it is in general advantageous to install a standby, land-based receiver and to arrange for remote switch-over facilities, operated from the control terminal, to substitute the standby receiver for the normal receiver when necessary. This requires a further direct current signaling path from the control terminal to the land-based receiver location. When more than one land-based receiver is employed, it is desirable that the first receiver which picks up an incoming carrier, disable the other receivers. This is necessary to prevent interference from more distant receivers, that might receive a weak and noisy signal from a mobile station.

Figure 3:
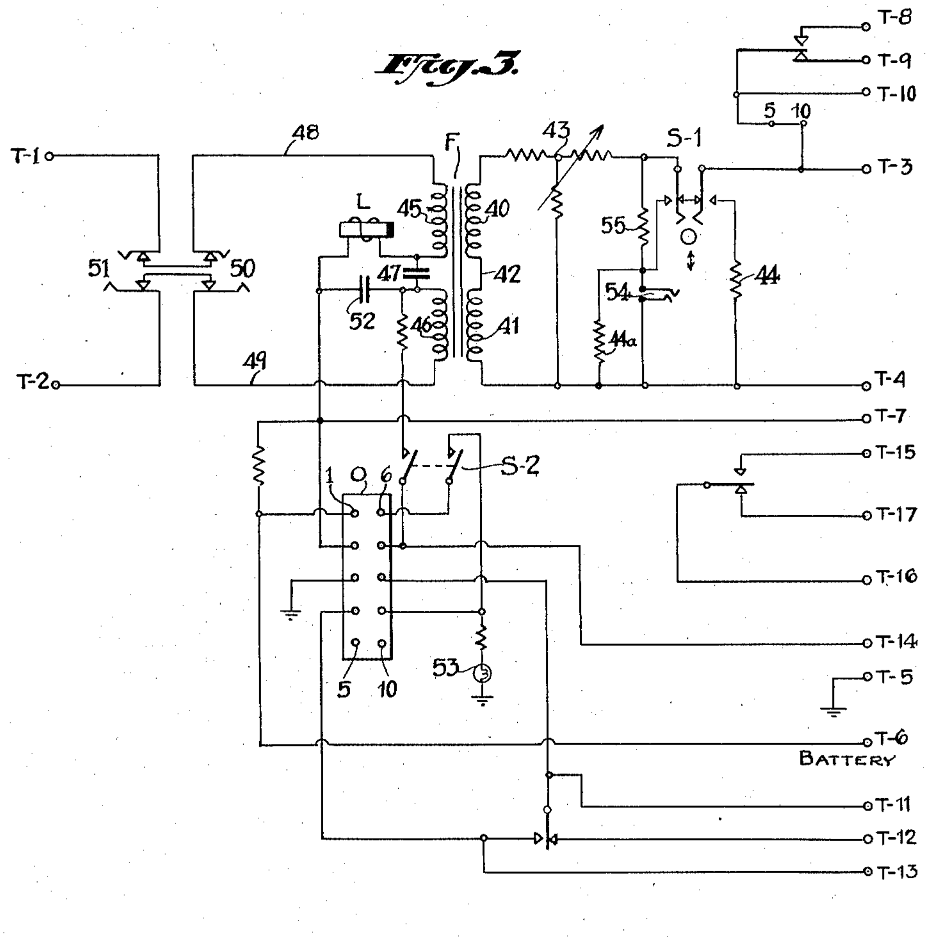
Figure 4:
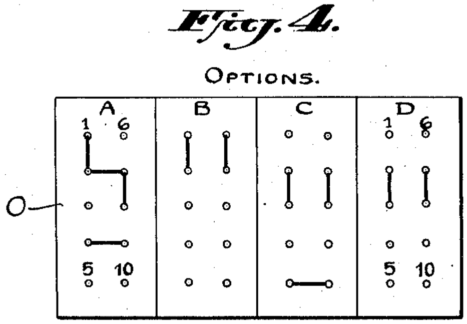
Figures 7, 8:
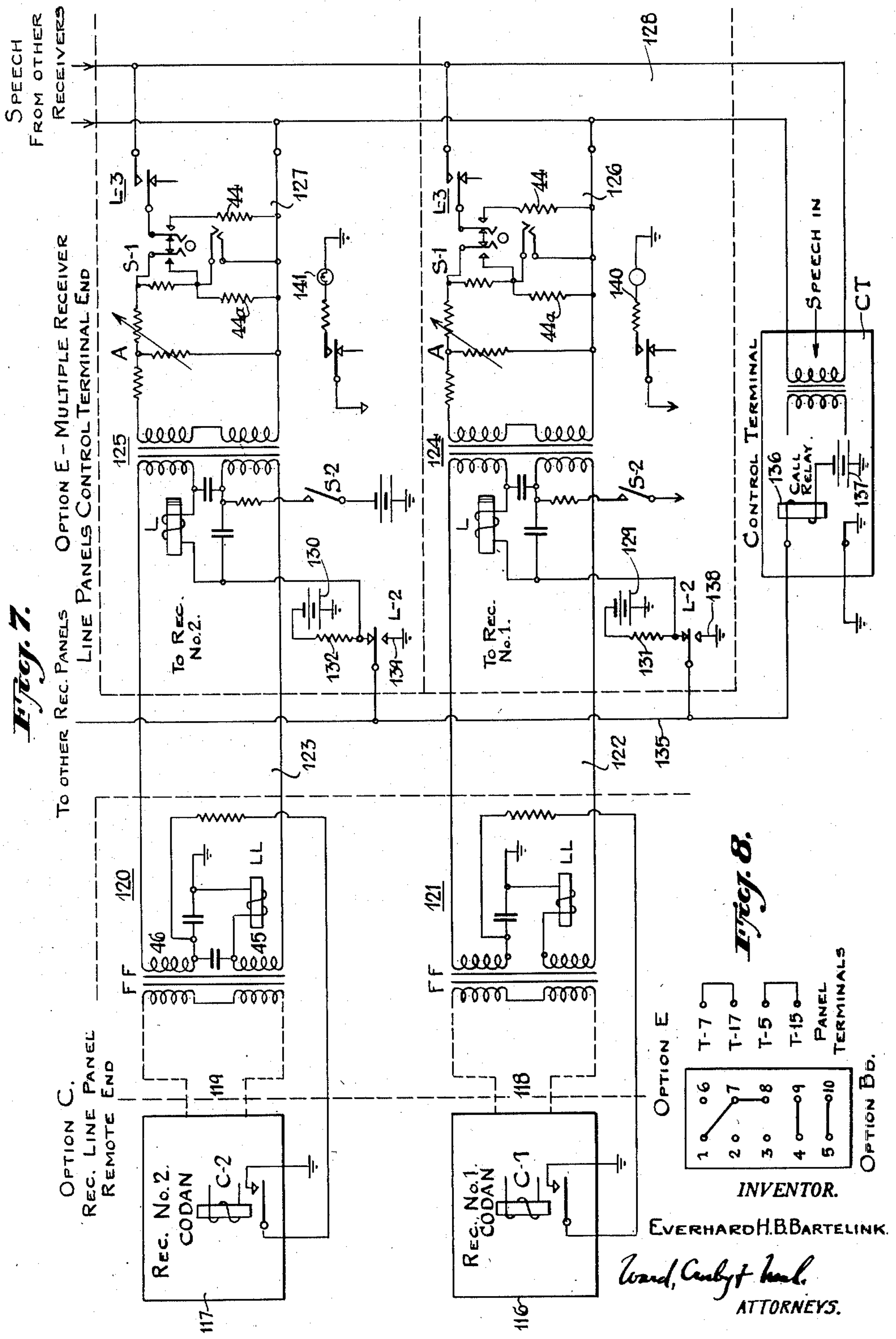

For effecting the aforesaid voice transmission and direct current signaling operations, a basic termination circuit has been devised, in accordance with one feature of the invention, the wiring diagram of which is shown in Fig. 3, which basic circuit may be wired on an associated option board O, in accordance with the various strapping connections illustrated as options A to D, inclusive, of Fig. 4, and option E of Fig. 8, for appropriately terminating the control terminal and distant ends of the two-conductor metallic circuits extending from the control terminal to the land-based transmitter and to the land-based receiver units respectively.

Referring to Fig. 3, this basic circuit comprises a four-winding, iron core transformer F, having the inner and outer terminals for each winding brought out, a pair of windings 40, 41 having their inner terminals strapped as at 42 and their outer terminals normally connected respectively through a T-type attenuator pad 43 and contacts of a switch S-1 to a pair of terminals T-3, T-4. When switch S-1 is actuated, the upper connection from the attenuator 43 to terminal T-3 is opened, and in substitution therefore, a line terminating resistance 44 of, for example, 600 ohms is bridged between terminals T-3, T-4; while a similar line termination resistance 44a is bridged across the attenuator 43. The remaining pair of transformer windings 45, 46 are connected together at their inner terminals through a condenser 47, their outer terminals extending respectively over connections 48, 49 and through circuit-breaking jacks 50, 51 to a pair of terminals T-1, T-2. Bridged across condenser 47 is a connection which includes in series a line relay L and another condenser 52. These condensers isolate the upper and lower conductors 48, 49 to provide separate direct current signaling circuits as above mentioned and explained below; while the transformer F isolates the voice circuit. The basic circuit also includes an option board O having terminal lugs 1 to 10 inc. thereon, and also includes various connections extending from the terminal lugs of the option board to other terminals, such as T-6, T-7, etc., the significance of which will become aparent from subsequent discussion thereof. The line relay L has various contacts L-1 to L-3 inc., connected to various other terminals, such as T-8, T-12, T-15, etc., for purposes to be explained. The circuit also includes a pilot lamp 53 and a switch S-2 for purposes explained below; also a monitor jack 54, the latter normally connected across the attenuator pad 43 through a high resistance 55 of, for example, 3000 ohms, for monitoring purposes. When switch S-1 is operated, however, the monitoring jack 54 is bridged by the line terminating resistance 44a directly across the line attenuator 43, for measuring gain levels, etc., while resistance 55 is shunted out.

Figure 5:
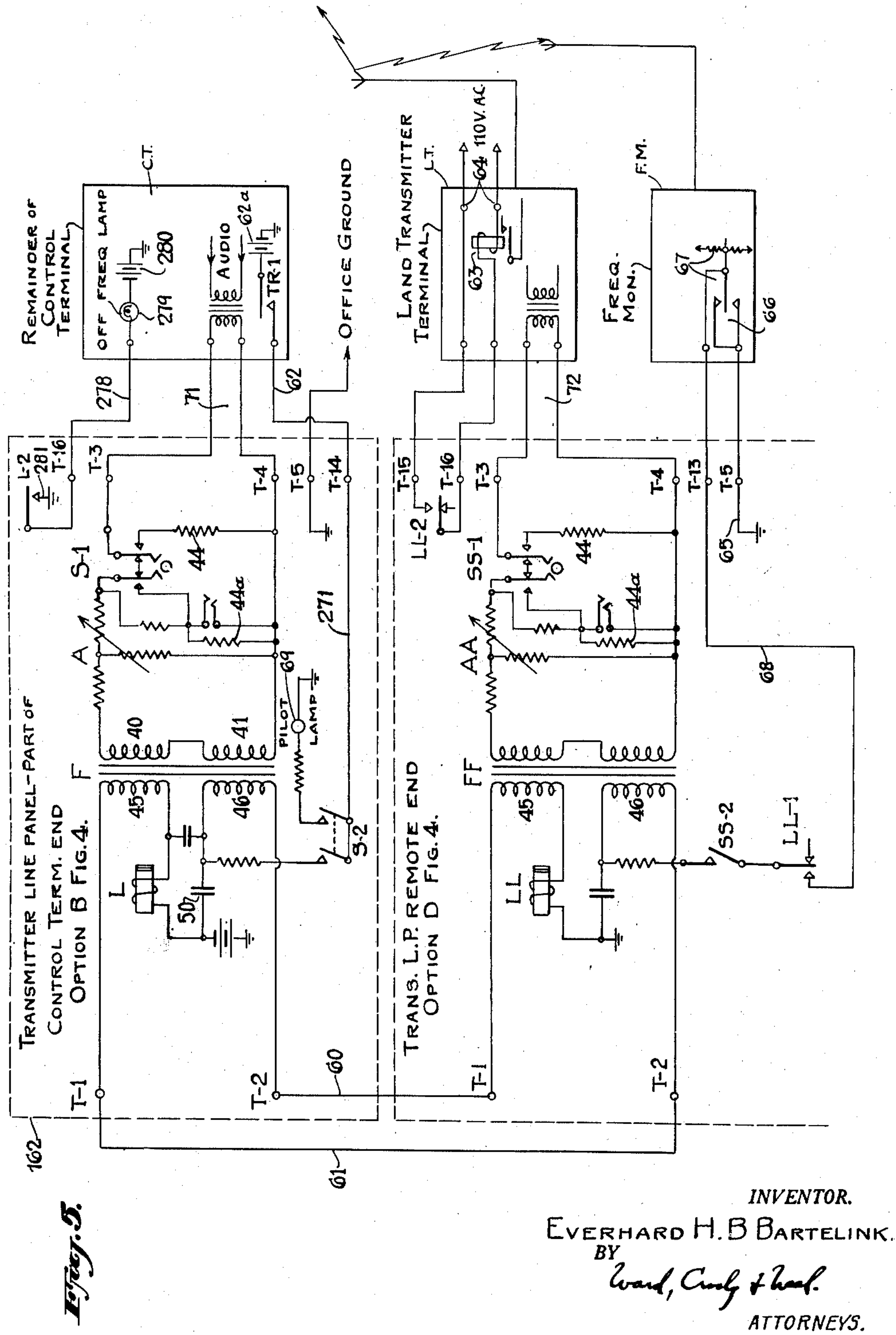

Referring to Fig. 5, there is shown a two-wire metallic circuit 60, 61 extending from the control terminal CT to a land-based transmitter LT, having thereat a frequency monitor FM. At the control terminal the metallic circuit 60, 61 is terminated in the basic terminating circuit or line panel of Fig. 3, as wired on the option board O thereof, in accordance with option A of Fig. 4; while at the land-based transmitter LT, circuit 60, 61 is terminated in the basic circuit of Fig. 3 as wired on the option board O thereof in accordance with option D of Fig. 4. Referring to Figs. 3 and 5, various of the terminals T-1 to T-17, inclusive, of the basic circuit of Fig. 3, are connected to the Fig. 5 circuit, to the control terminal CT, to the land-based transmitter LT, to the frequency monitor FM, and to the metallic circuit 60, 61, in the manner designated by the like-numbered terminals T-1, T-2, etc., in the Fig. 5 showing. Also in the Fig. 5 showing, the line relays, attenuator pads, transformers, etc., of the basic circuit, as employed at the control terminals and distant ends of circuit 60, 61, respectively, are designated L, A, F, etc., and LL, AA, FF, etc., respectively, in order to avoid confusion.

Referring now more specifically to the operation of the Fig. 5 circuit, the control terminal CT will apply battery to conductor 60, as explained below, to the line panel terminal T-14 at the control station, whenever it is desired to switch on the remote, land-based transmitter LT. This battery 62a applied to connection 62, will cause current to flow over this conductor and through the left-hand contacts of the normally closed toggle switch S-2 at the control terminal, thence through the lower transformer winding 46 thereat and over conductor 60 of the metallic circuit, to the line panel at the distant transmitter station, thence through the upper winding 45 of transformer FF thereat, and through the LL relay to ground, causing this relay to operate. Operation of the LL relay will complete, through its LL-2 contacts, a circuit to switch on the plate power relay 63 of the transmitter LT, over a circuit energized from 110 volts alternating current supplied to the transmitter power supply terminals 64. Operation of the LL relay also completes a circuit from the frequency monitor FM at the land-based transmitter and extending to the control terminal, to indicate whether the transmitter is operating "on frequency." This circuit is traced from ground at 65, through the contacts 66 of the contacting galvanometer 67 in the frequency monitor, and over connection 68 therefrom through the LL-1 contacts of the LL relay, through the normally closed switch SS-2 at the transmitter, and through the lower winding 46 of the transformer FF thereat, and over conductor 61 of the metallic circuit, to the control terminal line panel, and through the upper winding 45 of transformer F thereat, and thence through the line relay L to battery. The L relay will be energized over this circuit whenever the transmitter LT is energized and is operating off frequency, because only at such times will the contacting galvanometer 67 in the frequency monitor apply the ground connection 65 through its contacts 66. When, however, relay L is thus operated, it will, by closing its L—2 contacts, operate an alarm circuit in the control terminal over circuit connection 278 as described below. Application of battery 62a to conductor 62 at the control terminal also lights the pilot lamp 69 in the line panel, through the right-hand contacts of toggle switch S—2, to indicate that the transmitter is switched on. Operation of switch S—2 prevents the transmitter from being switched on by an operation of the control terminal CT. Operation of the switch S—1 interrupts the voice frequency circuit 71 from the control terminal, and terminates the circuit in the line terminating resistance 44, as explained. It also terminates the metallic circuit 60, 61, in a corresponding terminating resistance 44a through the attenuator pad A. At the distant end, the frequency monitor may be disconnected by operation of switch SS—2. Likewise, operation of switch SS—1 disconnects the metallic circuit 60, 61 from the speech input circuit 72 to the transmitter LT, and substitutes therefor the line terminating resistance 44a, while terminating the metallic circuit 72 in resistance 44.

Figure 6:
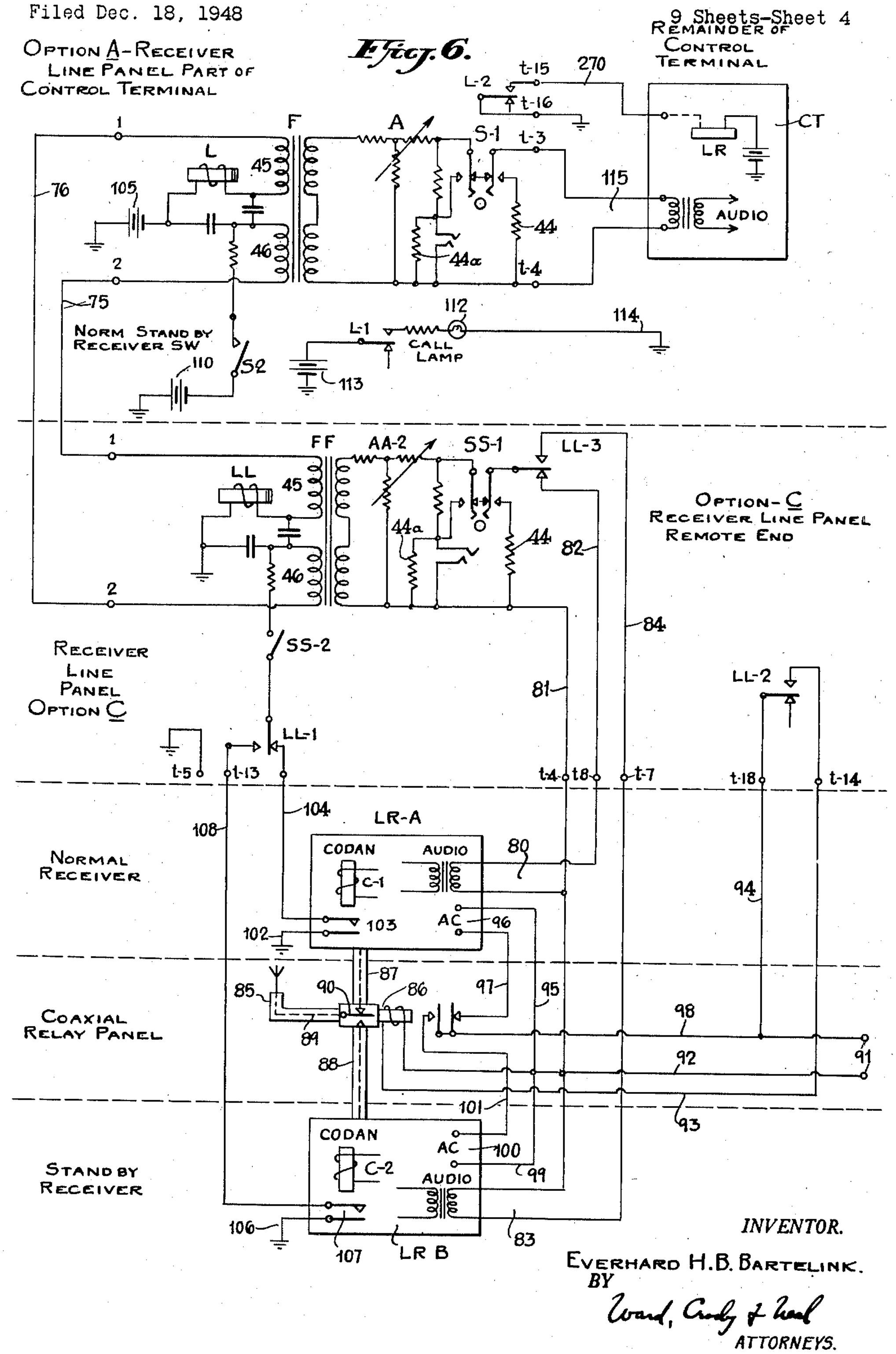

Referring now to Fig. 6, there is shown a two-wire metallic circuit 75, 76, extending from the control terminal CT to a land-based receiver station, at which are located a normally used radio receiver LR—A and a standby receiver LR—B. At the control terminal, circuit 75, 76 is terminated in the basic terminating circuit of Fig. 3, as wired on the option board O thereof, in accordance with option A of Fig. 4; while at the land-based receiver station, circuit 75, 76 is terminated in the basic circuit of Fig. 3 as wired on the option board O in accordance with option C of Fig. 4.

The audio frequency output 80 of the normal receiver LR—A is connected to circuit 75, 76 through transformer FF over connections 81 and 82, the latter extending through the LL—3 back contact and armature of the LL relay, and thence through the normally closed contacts of toggle switch SS—1. The audio frequency output 83 of the standby receiver LLR—B is connected to circuit 75, 76 through the FF transformer, over connections 81 and 84, the latter extending through the LL—3 front contact and armature of the LL relay. Thus the voice output of the normal receiver LR—A is normally connected to the metallic circuit 75, 76, extending to the control terminal, but upon operation of the LL relay the voice output of the standby receiver LR—B is substituted therefor. A common, co-axial antenna circuit 85 provides the incoming radio frequency signal pickup for both the normal and standby receivers LR—A and LR—B, the antenna circuit being selectively connectible to either the LR—A or LR—B receivers under control of the co-axial antenna switch over relay 86. It will be noted in this connection, that the outer sheath of the antenna cable concentric conductor is permanently connected into both receivers LR—A and LR—B as at 87, 88, while the center conductor 89 terminates in a switch arm 90, displaceable between upper and lower contacts connected respectively to the central conductors of connections 87 and 88 extending into receivers LR—A and LR—B, respectively. Normally, the switch arm 90 rests against its upper contact to connect the antenna circuit into receiver LR—A, but energization of the switch-over relay 86 connects the antenna to the standby receiver LR—B. Relay 86 is energizable from a source of socket power supplied to power input terminals 91, this circuit being traced from the lower of terminals 91 over connection 92, through the winding of relay 86 and over connection 93, through the LL—2 front contact and armature of the LL relay, returning thence over connection 94 to the upper power input terminal 91. Thus, operation of the LL relay actuates the co-axial antenna switch-over relay 86 to transfer the antenna circuit 85 from the normal or LR—A receiver to the standby or LR—B receiver. The socket power supply for energizing both the normal and standby receivers LR—A and LR—B, is also supplied from the power input terminals 91, through back and front contacts, respectively, of the antenna switch-over relay 86. Thus the power supply circuit for receiver LR—A is traced from the lower power input terminal 91 over connections 92 and 95, to the receiver power supply input 96, returning thence over connections 97 and 98 through the outer right back contact and armature of relay 86. The power supply circuit for the standby receiver LR—B extends from the lower power supply terminal 91, over connections 92 and 99, to the receiver power input terminals 100, returning thence over connections 101 and 98, through the inner right front contact and inner armature of relay 86. Thus, operation of relay 86 switches the power supply from the normal receiver to the standby receiver LR—B. As above stated, a direct current signaling circuit must be provided over the metallic circuits 75, 76, to relay to the control terminal, operations of the Codan relay C—1 or C—2 of the normal or standby receiver LR—A or LR—B, whichever happens to be in operation at any particular moment. This direct current signaling circuit for the C—1 relay extends from ground 102 thereat, through contacts 103 of the C—1 Codan relay, thence over connection 104 through the LL—1 back contact and armature of the LL relay, through normally closed toggle switch SS—2 to the lower transformer winding 46 of the FF transformer, thence over connection 76 to the control terminal, and through winding 45 of the F transformer thereat, and thence through the L relay to grounded battery 105. In somewhat similar fashion, the operating circuit of the C—2 Codan relay of the standby receiver extends from ground 106 thereat, through its operating contacts 107 of the relay C—2 and over connection 108, and through the LL—1 front contact and armature of the LL relay, to the toggle switch SS—2, the operating circuit extending thence to the control terminal being the same as that above traced for the C—1 relay. Accordingly, operation of the LL relay transfers the signaling circuit for the receiver Codan relay from the normal receiver LR—A to the standby receiver LR—B. For switching operations from the normal or LR—A receiver to those of the standby receiver, a remote switch-over circuit is provided which extends from grounded battery 110 at the control terminal, through toggle switch S—2 thereat, thence through the lower winding 46 of the F transformer, and over conductor 75 to the receiver station, thence through the upper winding 45 of the FF transformer thereat and through the LL relay to ground. Thus, so long as the toggle switch S—2 remains open, the LL relay will be released, to close all operating circuits for the normal receiver LR—A through the LL-1 to LL-3 armatures and back contacts of the LL relay. Operation of toggle switch S-2, however, completes the operating circuit above traced for the LL relay, thereby to energize the same and switch its LL-1 to LL-3 armatures from their back to their front contacts, thus to substitute the standby receiver LR—B for the normal receiver LR—A, in the various operating circuits above traced.

As above pointed out, the L relay at the control terminal will operate whenever the receiver Codan relay, C-1 or C-2, connected thereto operates. That is to say, the L relay at the control terminal repeats the operations of the receiver Codan relay connected thereto. Operations of the L relay at the control terminal line panel are transmitted into the remainder of the control terminal CT itself, over a circuit 270, completed through the L-2 armature and front contact of the L relay, for purposes as explained hereinafter in connection with a description of the control terminal circuit. Operation of the L relay in response to operation of the receiver Codan relay, also lights a call lamp 112 in the line panel at the control terminal, over a circuit traced from battery 113 and extending through the L-1 armature and front contact of the L relay, and through the call lamp 112 to ground at the control terminal or central office, over a connection 114 extending thereto, and as referred to hereinafter in connection with a description of the control terminal circuit operations. The speech input from circuit 75, 76 into the control terminal, extends through the transformer F and attenuator A, and toggle switch S-1, to the control terminal speech input circuit 115.

When a mobile radio system in accordance with the invention requires a multiplicity of land-based radio receivers disposed at various points over a geographical area to be served, it is necessary to employ the circuit arrangement of Fig. 7. Referring to this figure, two land-based receivers are illustrated diagrammatically at 116, 117, the speech outputs 118 and 119 from which are respectively connected through line terminating circuits 120 and 121, per Fig. 3, as wired in accordance with Option C of Fig. 4, to metallic circuits 122 and 123, extending to the control terminal CT. At the control terminal, each of the metallic circuits 122 and 123 is terminated in a line terminating circuit 124, 125, per Fig. 3, as wired, however, in accordance with Option E of Figs. 3 and 8. The audio output connections 126, 127 from the line terminating circuits are bridged across a common circuit 128, comprising the speech input circuit to the remainder of the control terminal CT. Referring, for the moment, to Fig. 8 in connection with Fig. 3, it will be noted that the option E wiring includes, in addition to the strapping connections shown on terminals 1 to 10 of the option board O, also strapping connections between panel terminals T-7 and T-17, and between T-5 and T-15, of the Fig. 3 circuit. In the circuit of Fig. 7, the L relay in each receiver circuit 122, 123 at the control terminal, is energized, as in the Fig. 6 arrangement, over a circuit traced from grounded battery 129, 130, through a current limiting resistance 131, 132, thence through the L relay winding and over one of the conductors 122, 123, to ground at the receiver station through contacts of the Codan relay C-1, C-2. However, in the Fig. 7 circuit, each of the resistors 131, 132 is also connected on the side away from the battery, to the L-2 back contact of the corresponding L relay, the corresponding armature of which is connected to a conductor 135, which latter extends to the winding of a call relay 136 in the control terminal, the opposite end of which winding is connected to grounded battery 137. In addition, the L-2 front contact of each of the L relays, is connected to ground as at 138, 139. Accordingly, whenever a mobile station places a call, the land-base receiver, such as 116 or 117, which is the first to operate its Codan relay C-1 or C-2, energizes the corresponding L relay at the control terminal, the operation of which connects its L-2 armature to its grounded front contact, such as 138 or 139, which thus connects ground, over conductor 135, to the L relays of all of the other land-based receiver circuits, thereby preventing any such other L relays from operating. Thus, for example, assume that when a mobile unit places a call, it is closest to the land-based receiver station 116, and hence causes its Codan relay C-1 to operate before the Codan relays of any of the other receiver stations are operated. The operation of Codan relay C-1 will connect ground through its contacts to the upper conductor of the metallic circuit 122, thereby to actuate the L relay in the line terminal circuit 124 at the control terminal. Operation of this relay connects the ground at 138 to its L-2 armature, which ground connection is immediately applied over conductor 135 and through the L-2 armature and back contact of the L relay in terminal 125, to the L relay winding thereat, thus preventing any operation of this relay in response to operation of the corresponding Codan relay C-2 at the land-based receiver 117. A selection of this character takes place upon initiation of each call from a mobile unit. Since the amount of incoming carrier of any receiver circuit is related to the quality of reception, the first receiver having its Codan relay thus energized, will probably have the least signal-to-noise ratio, and for this reason it is desirable that this receiver be selected for the incoming call, to the exclusion of all others. Thus the best receiver is automatically chosen on each call. By means of the contacts L-3 of the L relay, the speech incoming on the receiver circuit thus selected, is switched into the control terminal over its speech input circuit 128, and from whichever receiver circuit has its line relay L thus operated. Operation of the switches S-1 and S-2 and the line lamps 140 and 141 in the line terminating circuits 124, 125, etc., is the same as for the Fig. 6 circuit above described.

Figure 9:
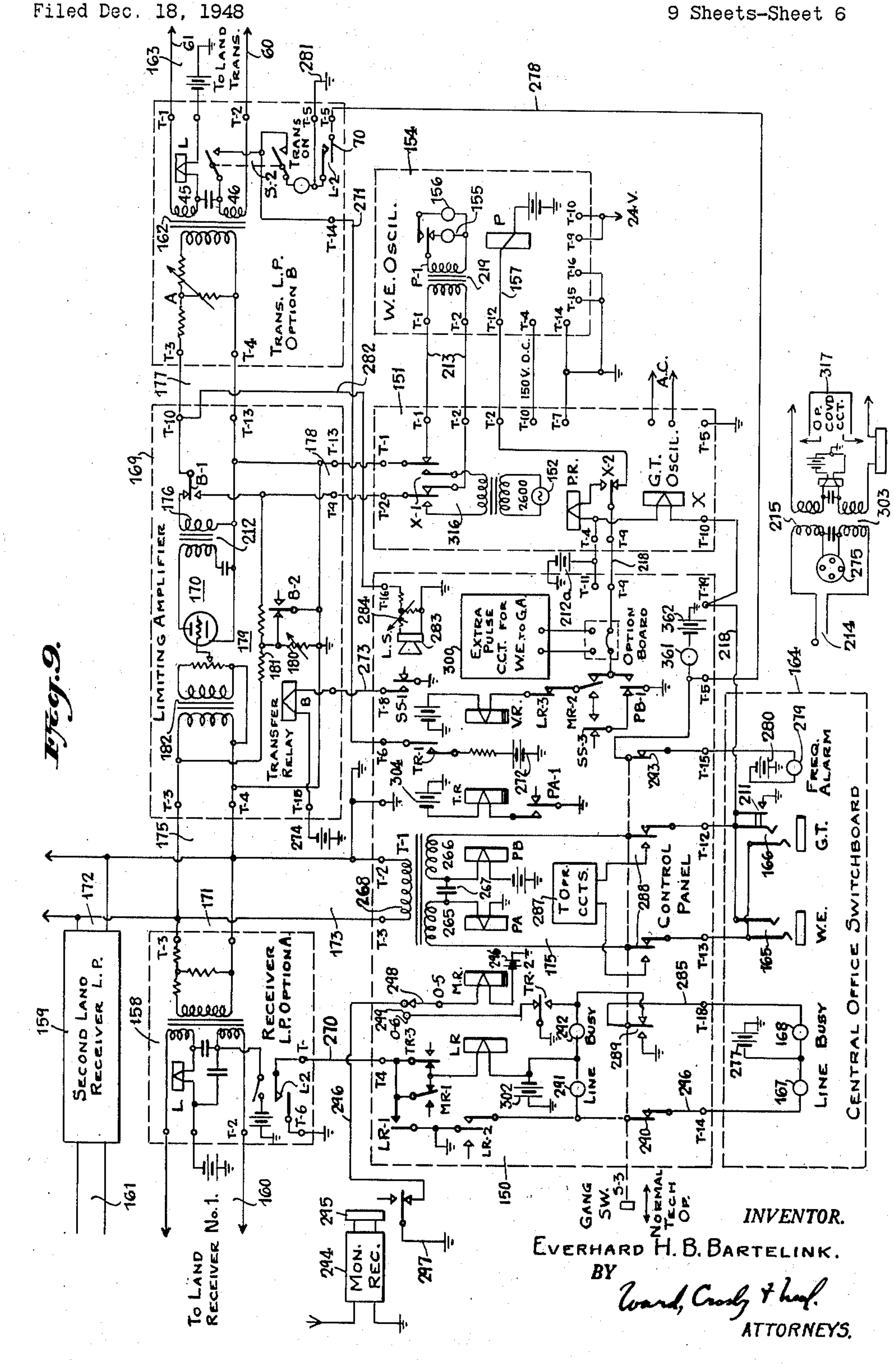
Figures 10, 10A:
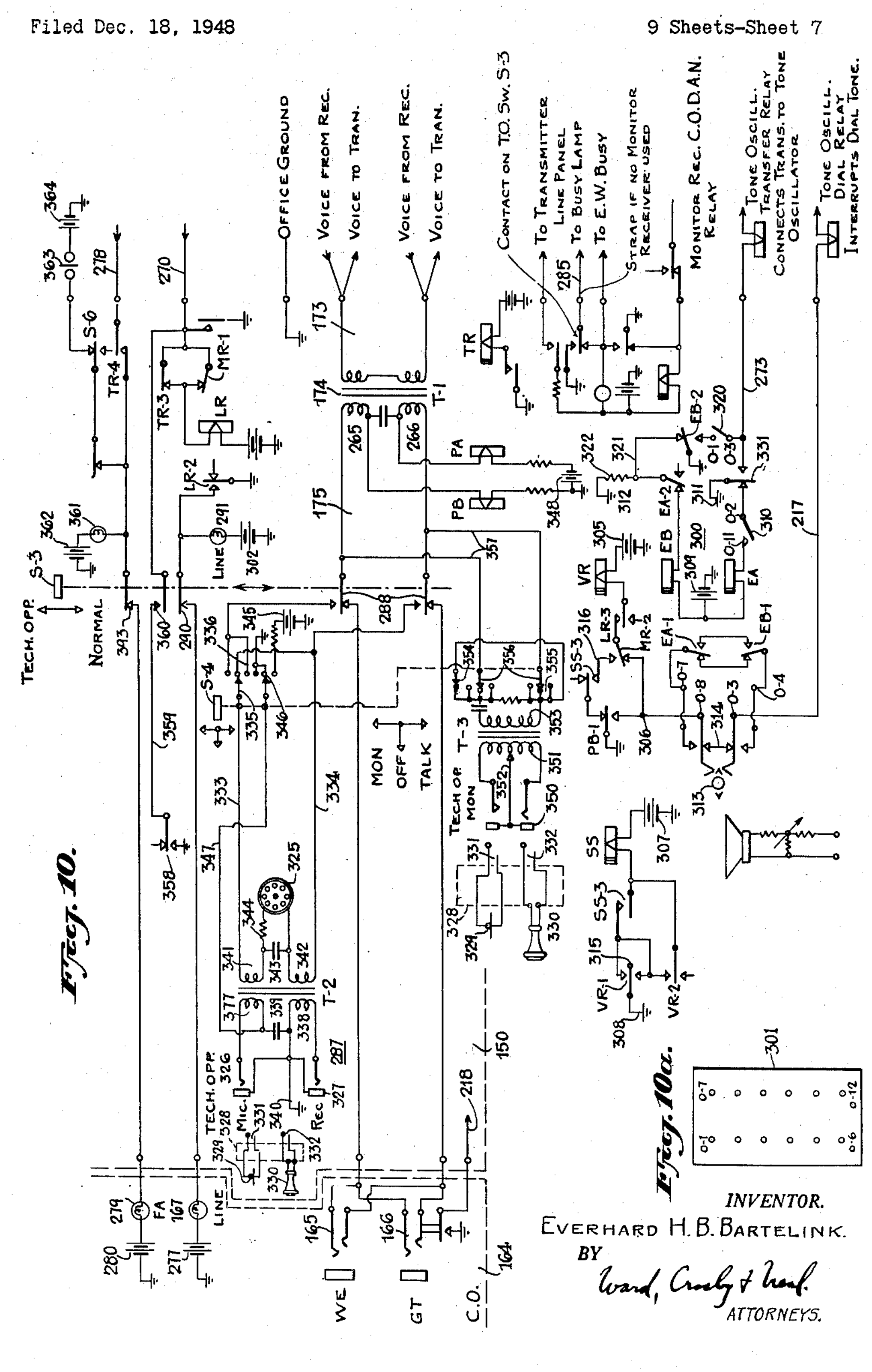

Reference is now had to Figs. 9 and 10, which show in circuit diagram form, the overall system layout of the control panel and appurtenant apparatus in accordance with the invention. Referring to Fig. 9, the essential circuit components thus involved comprise: (a) the control panel as designated by the rectangle 150, and embodying the circuits and apparatus enclosed within the rectangle, shown in Fig. 9 in rather a simplified form, but shown in complete wiring diagram form in Fig. 10; (b) an oscillator panel 151, mounting a dial tone oscillator 152 and a dialing relay PR, for dialing mobile stations equipped with station selectors in accordance with my co-pending applications 729,828 and 20,719, wherein station selection is effected by dialing pulse interruption of a single dial tone, the wiring diagram for this oscillator circuit being shown in simplified form within the rectangle 151 of Fig. 9, the complete wiring diagram being shown, however, in Fig. 12, as discussed below; (c) an oscillator panel 154, mounting a pair of dial tone oscillators 155, 156 and a dialing relay P, for transmitting dial tone and dialing pulses to mobile stations equipped with the Western Electric Company's 106A type of station selector, wherein station selection is effected by switching from dial tone of one frequency to dial tone of another frequency, in accordance with dialing pulses, this oscillator circuit being known as the Western Electric Company's J-68311A-1 oscillator, as embodied in its G-2 control terminal, and employing, as stated, its 106A type of station selector, all this equipment being well known in the art, as described in the Western Electric Company's patents and literature on the subject, and hence requiring no detailed description herein, the essentials of the oscillator circuit, for purposes of the present invention, being sufficiently disclosed within the rectangle 154 aforesaid; (d) the control terminal receiver line panels such as 158, 159, of one or more land-based receiver circuits such as 160, 161, as wired in accordance with Fig. 6 above discussed, where only one land-based receiver circuit is employed, and as wired in accordance with Fig. 7 above discussed, where more than one land-based receiver circuit is employed; (e) the control terminal transmitter line panel 162 for the land-based transmitter circuit 163, the complete wiring diagram of which is shown in Fig. 5, above discussed; (f) the central office switchboard panel 164, illustrated as mounting the necessary switchboard jacks 165, 166, supervisory and busy lamps 167, 168, etc., for operation in accordance with the system of the present invention, as discussed below; and (g), a limiting amplifier panel 169, mounting a limiting amplifier 170, shown in simplified form in Fig. 9, the complete wiring diagram of which is, however, shown in Fig. 11, discussed below.

Referring still to Fig. 9, the general layout of the system is as follows: The voice frequency outputs 171, 172 of the land-based receiver circuits 160, 161 are connected in parallel to a two-wire metallic circuit 173, which extends through a transformer T-1 to a two-wire metallic circuit 175, which latter terminates at the central office switchboard 164, in the tip and sleeve conductors, respectively, of the operator's switchboard jacks 165, 166, in multiple. To circuit 173 there is also connected, in parallel with the receiver circuit voice frequency outputs 171, 172, the audio input circuit 175 of the limiting amplifier 170, the output circuit 176 of which is connected, through the B-1 back contact and armature of a transfer relay B, to the voice frequency input circuit 177 of the land-based transmitter circuit 163. It will be seen that with the circuit as traced thus far, speech incoming over either of the land-based receiver circuits 160, 161, will be transmitted over circuits 173, 175 to the operator's switchboard jacks 165, 166, and will also be transmitted over circuit 175 and through the limiting amplifier 170 to the land-based transmitter circuit 163, for re-transmission from the land-based transmitter, this latter for permitting one mobile station to talk with any other, as discussed more fully below.

As was mentioned above, a dial tone is applied to the land-based transmitter on outgoing calls, and interruptions or frequency changes of this dial tone are used to transmit the dialing code, which will activate the selectors in the mobile unit and operate the bell or buzzer in the mobile station called. As was also mentioned above, the limiting amplifier 170 is provided in order to prevent over-modulation of the transmitter and to apply additional amplification to weak incoming signals such as might be obtained, for instance, over a high-attenuation toll line connected to one of the switchboard jacks 165, 166.

The limiting amplifier 170 would cause serious distortion in the dial pulses obtained from the tone oscillators 152 or 155, 156. For this reason, it is necessary completely to disconnect the limiting amplifier 170 whenever the dialing operation is performed. Accordingly, the audio frequency input circuit 177 to the land-based transmitter circuit 163, is connected to the B-1 armature of the transfer relay B, which relay, when de-energized, connects this armature to the limiting amplifier output circuit 176, but which, when energized, transfers the transmitter input circuit 177 to the output from one of the tone oscillator panels 151, 154 over a circuit 178, in the manner described below. The manner in which the transfer relay B is energized by circuits in the control panel will be discussed later. At this point, however, it is pertinent to bring out that the transfer relay B is also provided with an additional set of contacts B-2, the function of which is to apply the dial tone, emanating from one of the oscillator panels 151, 154, to the switchboard operator's jacks 165, 166, thus to inform her when the dial tone circuit selected is ready for the start of the dialing operation. For this purpose, a T-pad attenuator 179 is connected, as shown in Fig. 9, between the tone oscillator output circuit 178 and the limiting amplifier input circuit 175. Normally, the shunt arm 180 of the attenuator 179 is shorted out by means of the B-2 armature and associated back contact of the transfer relay B. This leaves a high resistance comprising the series arm 181 of the attenuator, bridged across the input circuit 175 to the limiting amplifier during speech transmission periods, but this does not affect the circuit operation, due to the negligible attenuation thus produced. When, however, the transfer B is energized as explained below, the short through its B-2 contacts is removed and the dial tone circuit 178 is thus connected through the attenuator 179 and over circuits 173, 175 to the operator's switchboard jacks 165, 166. The level of this dial tone transmitted to the switchboard jacks, can be adjusted by means of the variable shunt arm 180 of the attenuator 179. Also, and as above pointed out, when the B relay is energized the dial tone is transmitted from circuit 178 through the B-1 contacts of the B relay to the land-based transmitter over circuits 177, 163.

Figures 11, 11A:
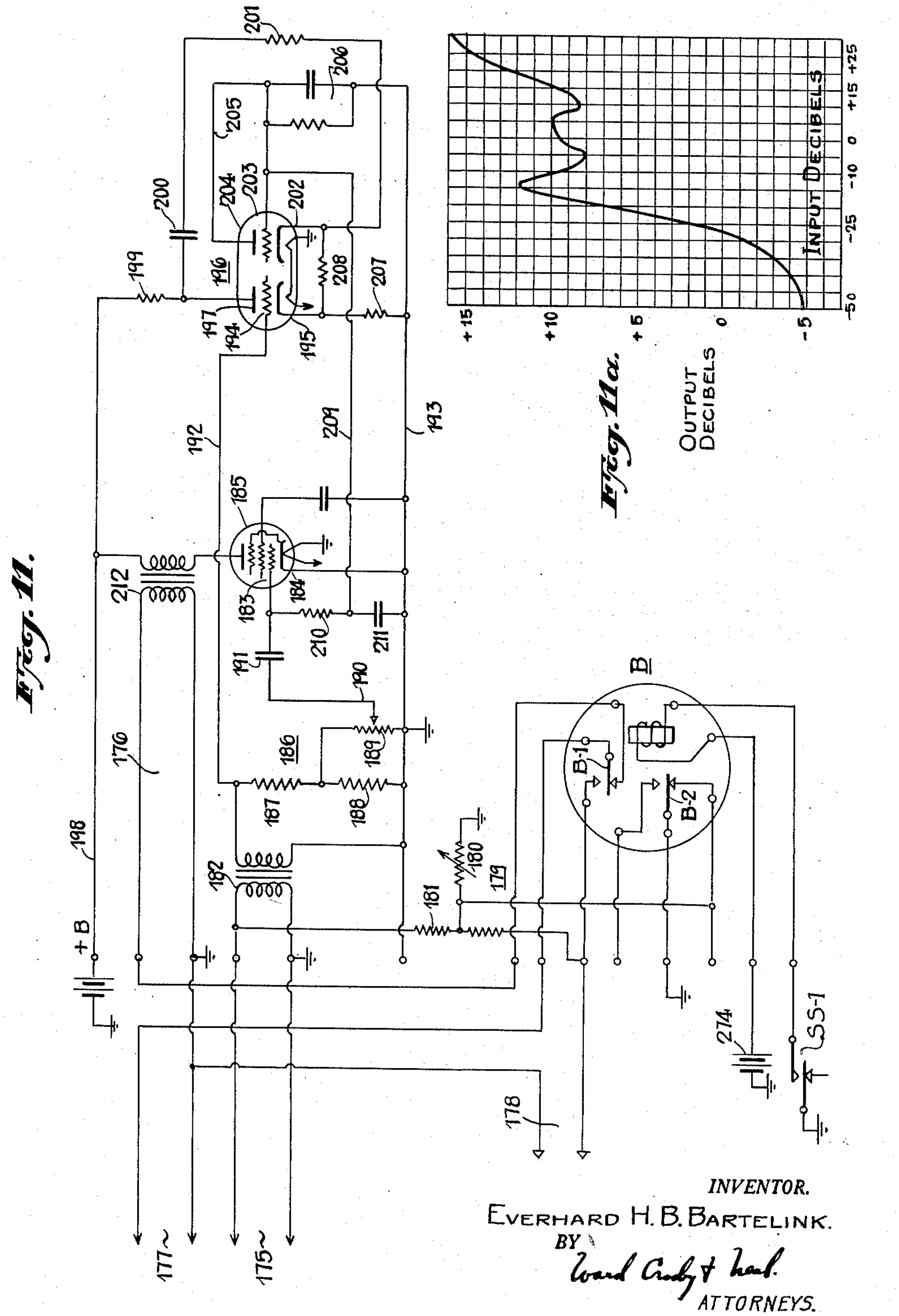

During normal talking periods, voice frequency components which are to be transmitted to the land-based transmitter, either through the switchboard jacks 165, 166 or from one of the land-based receiver circuits 160, 161, are applied to the limiting amplifier input circuit 175, via circuit 173, which limiting amplifier 170 is, as above explained, normally connected through its output circuit 176 and the B-1 back contact and armature of the B relay, to the land-based transmitter circuit 163 via its input circuit 177. The circuit and operation of the limiting amplifier is, referring now to Fig. 11, as follows: The speech input to the limiting amplifier is applied over its input circuit 175, to the primary winding of an audio frequency input transformer 182, the secondary of which is connected between the control grid 183 and cathode 184, of a variable transconductance amplifier tube 185, such as a 6SG7 tube, through a volume-adjusting network 186, comprising serially connected resistors 187, 188, across the lower of which is bridged a volume control 189, the adjustable arm 190 of which is connected through a grid blocking condenser 191 to the control grid 183. The speech input voltage appearing across the secondary of transformer 182, and across resistors 187, 188, is also impressed, over connections 192, 193, between the control grid 194 and cathode 195 of one section of a twin-triode tube 196 such as a 6SL7 wherein it is amplified and fed thence to the other half of this tube, which is connected as a diode. To this end, the anode 197 of the first section of tube 196 is connected to a source of +B or plate voltage over connection 198 through a load resistance 199, and is also connected through a blocking condenser 200 and resistance 201 to the cathode 202 of the second half of tube 196, the grid 203 and anode 204 of which are connected together over connection 205. A grid condenser and leak resistance in shunt 206 are connected between the grid 203 and the cathode 202 of the diode section of the tube, through a plate current grid biasing resistor 207 for the first half of the tube, and thence through a high resistance 208 interconnecting the cathodes 195 and 202. The rectified output of the diode, which is a negative direct current voltage of varying amplitude is fed back from the grid 203 of the diode over connection 209, to the grid 183 of the variable trans-conductance tube 185, through a grid leak resistance 210, the latter connected in series with a blocking condenser 211, between the grid and cathode of the variable trans-conductance tube 185. The resulting output of the limiting amplifier is fed thence through an output transformer 212 to the limiting amplifier output circuit 176, to which end the primary of transformer 212 is connected between the anode of the tube 185 and the plate supply voltage 198, while the secondary is connected in the output circuit 176. As is also shown in Fig. 11, with reference to Fig. 9, the limiting amplifier output circuit 176 is connected to the land transmitter input circuit 177 through the B–1 armature and back contacts of the B relay. Likewise, Fig. 11 shows the attenuator 179 bridged between the limiting amplifier input circuit 175 and the land transmitter input circuit 177, the latter through the B–1 back contact and armature of the B relay, the shunt arm 180 of the attenuator being normally shorted by the B–2 back contact and armature of the B relay.

Figure 11*a* shows the limiting action of the Fig. 11 amplifier at 1000 cycles. It can be seen from this graph that a reasonably constant output of ± decibel is obtained over approximately a 30-decibel input range. The volume control 187—190 of the amplifier input makes it possible to shift this range of regulation in such manner that it will coincide with the input levels normally encountered at this point.

Reverting to Figs. 9 and 10, a tone oscillator of panel 151 or 154 is connected to the system only during the initial dialing period of an outgoing call. The control terminal, as shown in Figs. 9 and 10, is so designed that it can be operated, as above stated, with several types of selector systems. Thus it can be operated with the Western Electric Company's 106A selectors in the mobile units, and the corresponding Western Electric J–68311A–1 oscillator in the control terminal, per oscillator panel 154. It can also be operated with selectors in the mobile units in accordance with my applications aforesaid, and in conjunction with the oscillator of control panel 151, the complete circuit diagram of which is as above explained, shown in Fig. 12. Also the control terminal may be used to operate in a mixed system, i. e., one in which part of the mobile units are equipped with the Western Electric 106A selectors, while other mobile units are equipped with station selectors in accordance with my applications aforesaid. In the latter case, both types of tone oscillators, per panels 151 and 154, must be provided at the control terminal. In the case where a mixed system is operated, the selection between the different groups of mobile units and the corresponding, appropriate tone oscillators per panels 151 and 154, is effected automatically by plugging into different jacks 165 and 166 on the operator's switchboard 164. It will be observed that the voice circuits for these jacks, i. e., the tip and sleeve conductors, respectively, are connected in multiple to the voice circuit 175, but that one of these jacks has an additional contact 211, which operates a system selection relay X when the operator inserts the plug 214 of her cord circuit 215 into jack 166. This circuit is traced from battery 212*a* through the winding of relay X, and over connection 218 to ground, through contacts 211 of jack 166. The system selection relay is provided with a pair of contacts X–1, which normally connect the dialing circuit 178 through the X–1 armatures and back contacts to the dial tone output circuit 213 of the Western Electric Company oscillator panel 154, and which connects, through its armatures and front contacts, the dialing circuit 178 with the dial tone output circuit 216 of the oscillator panel 151. Accordingly, if the operator inserts her cord plug 214 in jack 165, dial tone will be supplied from the Western Electric Company oscillator to the dial tone output circuit 178, through the X–1 armatures and back contacts of the X relay; whereas, if the operator inserts her cord plug into jack 166, the X relay will operate to transfer the dialing circuit 178 to the dial tone oscillator of panel 151. The X relay is provided with a second set of contacts X–2, which likewise transfers the dialing lead 217 from one oscillator circuit to the other, as explained hereinafter.

The Western Electric type J–68311A–1 oscillator of panel 154, Fig. 9, will not be described in detail in this application, as its construction and operation is well known, and per se it forms no part of the present invention. The fundamentals of the oscillator are sufficiently shown in Fig. 9 for purposes of the present invention. It comprises two oscillators 155 and 156, the one being normally connected through the P–1 front contact and armature of the pulsing relay P, and thence through an output transformer 219 to the output circuit 213; and the other being similarly connected to the output circuit 213 through the P–1 back contact and armature of the pulsing relay P. Thus fundamentally the Western Electric Company oscillator is operating continuously to connect either oscillator 155 or oscillator 156 to the output circuit. Oscillator 155 has a frequency of 600 C. P. S., which is thus normally applied to the output circuit, while oscillator 156 has a frequency of 1500 C. P. S. Operation of the pulsing relay P, in accordance with dialing impulses, as described below, switches the output circuit 213 alternately from 600 C. P. S. oscillator 155 to the 1500 C. P. S. oscillator 156, for dialing stations equipped with Western Electric Company 106–A type of selector.

Figure 12:
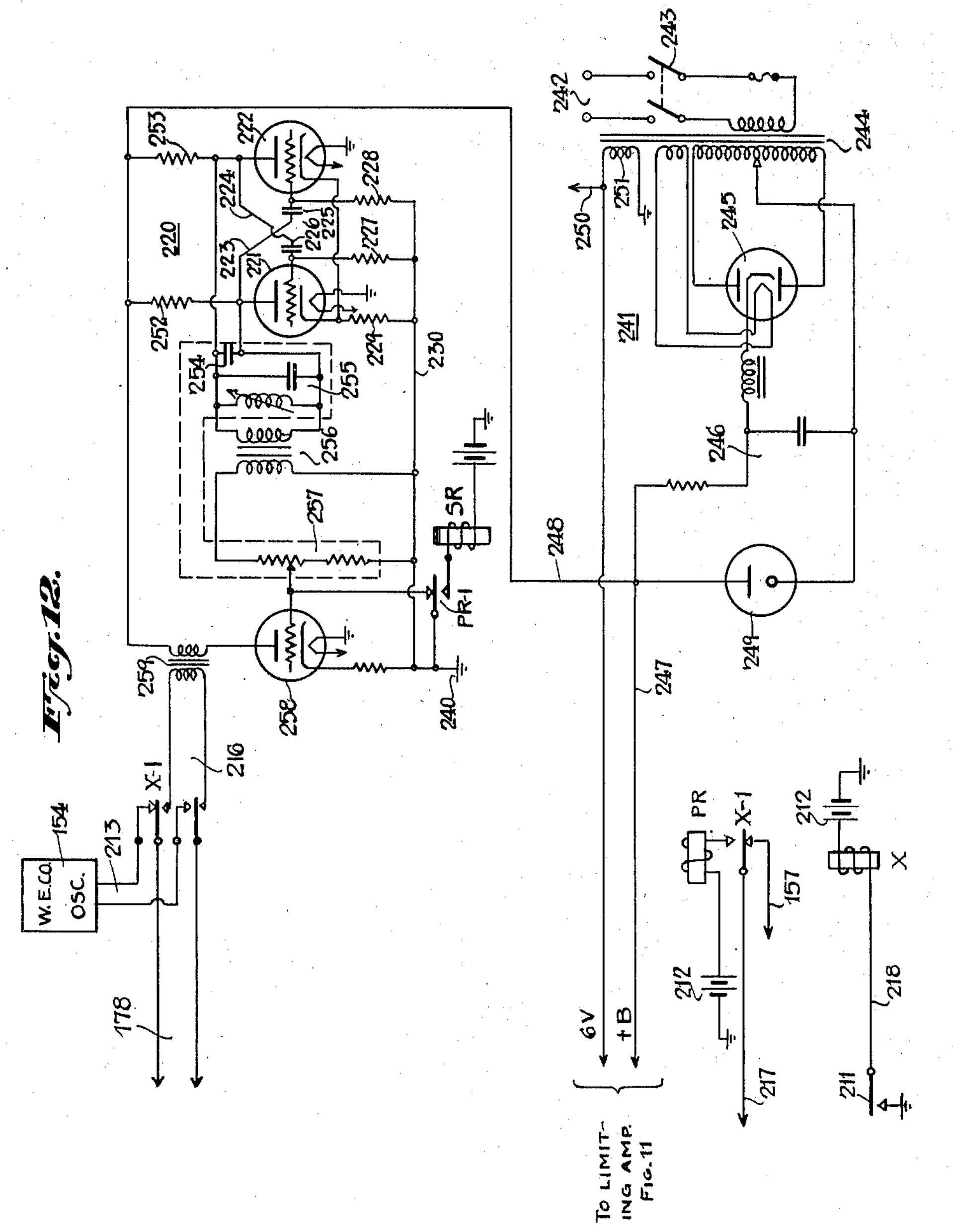
Figure 12 is the wiring diagram of the tone oscillator employed for dialing mobile units equipped with station selectors in accordance with my applications Serial Nos. 729,828 and 20,719 aforesaid, according to which station selection is effected by dialing interruptions of the dial tone.

The oscillator circuit of panel 151 employed for dialing mobile stations equipped with station selectors in accordance with my application aforesaid, according to which station selection is effected by interruption of a single dialing tone, is shown in Fig. 12, to which reference is now made. Referring to Fig. 12 the oscillator unit per se, 220, comprises a pair of electronic triodes 221, 222, connected in push-pull relation, the grid of each tube being capacitively connected to the anode of the opposite tube over connections 223, 224 containing condensers 225, 226, the grids being also connected to the cathodes of the tubes in common through individual resistors 227, 228, and the common biasing resistor 229, these resistors also being connected over a connection 230 to a common ground at 240.

The oscillator circuit is energized from a power pack 241 of conventional design, energized from a 110 volt A. C. power supply connected to terminals 242 and thence through a switch 243 to the primary of a power transformer 244, having connected thereto in conventional fashion a full wave rectifier tube 245, which supplies the anode or plus B voltage through a filter circuit 246, to connections 247 and 248, extending respectively to the limiting amplifier of Fig. 11, and to the oscillator circuit of Fig. 12. The filter output 246 is shunted by a $VR_{150}$ tube 249 for purposes of voltage regulation. The filaments of the various tubes in the oscillator circuit and also those of the limiting amplifier are supplied with 6 volts A. C. over connections 250, supplied from the low voltage secondary winding 251 of the power transformer 244. The anode voltage is supplied over connections 248 to the anodes of the oscillator tubes 221, 222, through the resistors 252, 253.

The oscillator circuit 220 is designed to provide a dial tone of 2600 C. P. S., the dial tone output voltage of which is delivered across condenser 254, to a high-Q tuned circuit 255, comprising a fixed condenser and variable inductance in parallel as shown. The output of this circuit is in turn applied through a transformer 256 and through a volume control 257 to the grid circuit of a triode power amplifier tube 258, the output of which is in turn applied through a line-matching output transformer 259, to the oscillator output circuit 216.

It will be noted that the grid of the power amplifier 258 is normally grounded through the PR-1 back contact and armature of the pulsing relay PR; and that the pulsing relay in turn, is energizable from battery 212 through the X-1 back contact and armature of the transfer relay X. The transfer relay X, is in turn energized, as above explained, from battery 212 over connection 218, extending to ground through the normally open contacts 211 of jack 166 at the switchboard, Fig. 9. Thus the transfer relay X must be energized by the operator plugging her cord-plug 214 into jack 166, Fig. 9, in order to connect the output of the oscillator 216 to the dialing circuit 178, Figs. 9 and 12. Accordingly, if the oscillator circuit of Fig. 12 is employed exclusively for station selection, the transfer relay must either be energized at all times, as by permanently grounding connection 218, Fig. 9, or by wedging up the X-1 armature of the X relay against its back contact.

Referring particularly to Fig. 12, the grid of the amplifier tube 258 is as shown, normally grounded through the PR-1 back contact and armature of the pulsing relay PR. As explained below, this relay is energized just prior to the dialing operation, from battery 212 to ground through the X-1 contact of the transfer relay C, and thence to ground over connection 217. Operation of the pulsing relay PR in turn connects ground to the slow release relay SR, Fig. 12, which holds up during dialing pulses. As noted below this slow release relay SR is required only where the Western Electric oscillator panel 154 is required in addition to panel 151 Fig. 9 for dialing mobile stations in a Western Electric G2 terminal and to provide the same circuit criteria as does the Western Electric J-68311A-1 oscillator panel 154.

Reverting to Figs. 9 and 10, which show the wiring diagram for the overall system layout, it will be noted that circuit 175 which extends from the operator's switchboard jacks 165, 166 terminates in two serially connected primary windings, 265, 266 of transformer T-1, which are interconnected at their midpoints by a condenser 267, transformer winding 265 being also connected at its midpoint through a relay PA, to ground, and winding 266 being also connected at its midpoint through a relay PB to battery. Transformer T-1 also includes a single secondary winding 268 which is connected across circuit 173, extending as above explained to the voice output circuits 171, 172 of the incoming land-based receiver circuits 160, 161, circuit 173, being also connected to the limiting amplifier input circuit 175. As above noted, under normal speech transmission conditions, one high impedance series element 181 of the T-pad attenuator 179, is bridged across circuit 173, the parallel branch 180 of the T-pad being normally shorted by the B-2 contacts of the transfer relay B. Also as above explained the output 176 of the limiting amplifier, is normally connected to the equipment side of the transmitter line panel through the B-1 back contact and armature of the B relay. During dialing periods, the transmitter relay B connects the equipment side of the transmitter line panel to one of the dial tone oscillators over circuit 178; and in addition it removes the B-2 contact short across the parallel branch 180 of the T-pad attenuator 179. This applies dial tone from the tone oscillator output circuit 178 to the outgoing land-based transmitter circuit 163, and also through the T-pad attenuator 179 to circuits 173 and 175 extending to the operator's switchboard jacks 165, 166. At the end of the dialing period, release of the B relay restores all circuits to the condition above described.

In addition to the voice circuits above described, the following signaling circuits exist between the control panel, and the various other panels above mentioned.

(a) A Codan relay connection 270 extends from the L-2 contacts of the L relay in the receiver line panel, to the winding of the line relay LR in the control panel. Referring momentarily to Fig. 6 in conjunction with Fig. 9, it will be recalled from the above that the operation of the land-based receiver Codan relay, such as C-1, on incoming calls operates the L relay, Figs. 6 and 9, on the control terminal, receiver line panel, thereby connecting ground to lead 270 through the L-2 contacts of the L relay. This in turn operates the line relay LR in the control panel to light the line lamp 167 on the operator's switchboard, 164, as explained more fully below.

(b) A transmitter control connection 271 extends from the upper contact of switch S-2 on the transmitter line panel to the TR-1 armature of a transmitter relay TR on the control panel.

It will be noted that the front TR-1 contact of the TR relay is connected to battery 272, so that when the TR relay operates it connects battery over lead 271 and through winding 46 of transformer 162 on the transmitter line panel and thence over conductor 60 of the land-based transmitter circuit 163 to ground through the LL relay, referring now to Fig. 5 at the distant or land-based transmitter circuit 163, thus to switch on the land-based transmitter in the manner above described in connection with Fig. 5.

(c) A connection 273 extending from the winding of the transfer relay B on the limiting amplifier panel to the SS-1 front contact of an SS relay, Fig. 10, on the control panel. It will be observed in this connection that the winding of relay B is connected on one side to battery 274 and on the other side to the SS-1 front contact, of the SS relay, the associated armature of which is grounded, so that when the SS relay operates it energizes the transfer relay B, with results as above explained. The SS relay is operated as explained below at the beginning of each dialing operation, and remains operated until the dialing and bell ringing periods are over, thus keeping the transfer relay B energized during this interval.

(d) A dialing lead 217, above referred to, extends from the control panel to the dial tone oscillator panel 151 and through the X-2 armature and back contact thereon to the winding of the pulsing relay P of the Western Electric Company oscillator panel 154. This dialing lead 217 has ground continuously applied thereto, at the control panel, as explained below, during the time that the operator has her cordplug 214 plugged into one of the switchboard jacks 165, 166, except for such periods as dialing operations are generated by actuation of the dialing equipment 275 in the operator's cord circuit 215. As above noted, the dialing lead 217 is normally connected through the X-2 armature and back contacts of the X relay to the pulsing relay P of the Western Electric Company dial tone oscillator panel 154; but if the X relay is energized, the dialing lead is then connected through the X-2 armature and front contact to the pulsing relay PR of the dial tone oscillator panel 151.

(e) A line lamp lead 276 extends from the line lamp 167 on the switchboard panel 164 to ground through contacts 290 of the technical operator's gang switch S-3, and through the LR-2 front contact and armature of the line relay LR on the control panel. Ground is applied to this lead through the LR-2 contact of the LR relay, whenever a call is incoming from one of the land-based receivers, thus to operate the LR relay as above explained. This lights the line lamp 167 from battery 277 connected thereto, and to ground over lead 276 as above noted.

(f) An "off-frequency" alarm connection 278 extends from the L-2 armature of the L relay on the control terminal, transmitter line panel 162, to an "off-frequency" alarm line lamp 279 on the switchboard panel 164, the opposite side of this line lamp being connected to battery 280. Referring momentarily to Fig. 5 in connection with Fig. 9, it will be recalled from the description of Fig. 5 that when the land-based transmitter is operating, but "off-frequency" ground 65 is applied over lead 68 to conductor 61 of the land-based transmitter circuit 163 extending to the control terminal, and actuates the L relay on line panel 162 thereat, operation of which connects ground 281 through the L-2 armature and front contact of the transmitter line panel L relay, to lead 278, thereby to light the "off-frequency" alarm lamp 279 on the operator's switchboard panel 164.

(g) An audio frequency connection 282 extends from the B-1 armature of the transfer relay B on the limiting amplifier panel 169 to a loud speaker 283 on the control panel, for monitoring purposes. The lead 282 is connected to the loud speaker through attenuator 284 for setting the loud speaker volume level as desired.

(h) A busy lamp connection 285 extends from the busy lamp 168 on the switchboard panel to ground through contacts 289 of gang switch S-3, and thence through the TR-2 front contact and armature of the transmitter relay TR. Ground is applied to this lead whenever the land-based transmitter is switched on, through the TR-2 contacts aforesaid, thus to light the busy lamp from battery 277 connected thereto.

(i) As above pointed out operation of the control terminal may be taken over by the control terminal "technical operator." And this may be effected by operation of a gang switch S-3 on the control terminal which switch is normally in the position shown in Figs. 9 and 10, but twhen operated to the left in Fig. 9 connects the technical operator's circuit 287 to the voice circuit 175, while disconnecting the switchboard jacks 165, 166 therefrom at gang switch contacts 288. Also operation of this gang switch applies ground at 289 to lead 285 thus to energize the switchboard busy lamp 168, as long as the technical operator takes over. Also operation of the gang switch to the left disconnects at its contacts 290, lead 276 extending to the switchboard line lamp 167, thus preventing this line lamp from being energized. On the control terminal the technical operator's position is provided with line and busy lamps 291, 292, which are energized over the same circuits above described, as are the switchboard line and busy lamps 167, 168. Operation of the gang switch 286 also opens at its contacts 293 the circuit 278 extending to the "off-frequency" switchboard alarm lamp 279.

(j) The control terminal may be equipped with a monitor receiver 294 for actuating an associated Codan relay 295 in response to transmission of carrier from the land-based transmitter, normally a connection 296 extends from ground 297 through the armature and back contact of the Codan relay 295, and through the winding of a monitor receiver relay MR on the control panel to battery 296. Thus the monitor receiver relay MR is normally energized over circuit 296, but becomes deenergized in response to energization of the Codan relay 295 of the monitor receiver, when the land-based transmitter is operating. When the MR relay thus releases, it also releases through its MR-1 contacts the control panel line relay LR, thereby to extinguish the switchboard line lamp 167 following operation of the TR relay as explained more fully below. If a monitor receiver 294 is not employed, an alternative operating circuit for the MR relay is obtained through the TR-2 contacts of the TR relay by actuating the switch arm of a switch 298 from the contact to which lead 296 is connected to a contact 299 to the back TR-2 contact of the TR relay, also for purposes and as explained more fully below.

(k) The PA relay in the switchboard circuit 175 controls through its PA-1 contacts the operation of the transmitter relay TR, as above noted. The PB relay in circuit 175 is one of a sequence of relays including a vibrating ray VR and a super slow relay SS, Figs. 9 and 10, which regulate the period during which the dial tone is applied to the switchboard and land-based transmitter circuits 175, 173 for effecting the dialing and subsequent ringing of a mobile unit called, also as explained below. The EB and EA relays, Fig. 10, form part of an extra pulse circuit 300, Figs. 9 and 10, required in conjunction with the Western Electric Company oscillator circuit 154, as explained below. The control terminal is equipped with an option board 301, Fig. 10*a*, provided with strapping terminals O–1 to O–12 inc. for strapping the extra pulse circuit 300 in or out, as required, depending on whether or not some of the mobile units are equipped with the station selectors responsive to the Western Electric oscillator circuit 154, and also for providing additional strapping connections, as explained below, but for convenience the corresponding straps have been shown as switches 298, Fig. 9, and 310, 313 and 320, Fig. 10.

The functions of the control terminal system of Figs. 9 and 10 will now be described, first with reference to incoming calls, then with reference to outgoing calls, and finally with reference to special circuits and operations incorporated therein.

*Incoming calls.*—Referring to Figs. 6, 9 and 10, when incoming carrier from a mobile station is received for example by land receiver LR—A, its Codan relay is energized to connect ground 102 through the lower winding of the FF transformer at the land receiver station and thence over conductor 76 to the control terminal receiver line panel and thence through winding 45 of transformer F thereat and through the L relay to battery, thus energizing the L relay. This applies ground through its L–2 contacts to connection 270 extending to the control panel. If at the time this call is incoming, the land-based transmitter is not operating so that the transmitter relay TR is deenergized and the monitor receiver relay MR is energized as aforesaid, application of this ground to connection 270 will immediately energize the control panel line relay LR from battery 302, through the LR relay winding and thence through the parallel paths comprising the TR–3 back contact and armature of the TR relay and the MR–1 front contact and armature of the MR relay. The LR relay upon operating, will immediately lock up to ground through its LR–1 front contact and armature, under control of the TR and MR relays as aforesaid. The LR relay upon thus energizing, applies ground through its LR–2 armature and front contact to the line lamp 291 at the technical operator's position, which lights up from battery 302, and also to the switchboard line lamp 167, which lights up from battery 277.

Nothing further happens until the operator inserts her cord plug 214 in jack 165. When this occurs, the voice circuit 175 is closed through the tip and sleeve conductors of the operator's cord plug 214 and thence through the dialing equipment 275 bridged across the midpoints of the primary winding of transformer 303 in the operator's cord circuit 215, it being understood in this connection that with the dialing equipment 275 in its normal position the cord circuit provides a short circuiting connection. Accordingly the PA and PB relays operate over the circuit traced from battery through the PA relay winding, transformer winding 266 and over circuit 175 through contacts 288 of switch S–3 and through the operator's cord circuit returning thence over circuit 175 through transformer winding 265 and the PB relay winding to ground. These are fast operating relays, employed in order to assure a minimum distortion of dialing pulses. Relay PA when operated, energizes the transmitter relay TR from battery 304 to ground through the PA–1 front contact and armature of the PA relay. The TR relay being slow release, will remain energized during dialing pulse operations of the PA relay. The TR relay upon energizing, applies battery 272 through its TR–1 front contact and armature to connection 271 extending to the control terminal, transmitter line panel and thence through switch S–2 and the lower winding 46 of transformer 162 and over conductor 69 of the land-based transmitter circuit 163 to operate relay LL, Fig. 5, at the land-based transmitter, thereby to switch on the power supply to the transmitter LT as above explained. In addition, operation of the TR relay, opens at its TR–3 contacts, one of the two operating paths through which the control terminal, line relay LR is held energized through its LR–1 contacts. In addition operation of the TR relay applies ground through its TR–2 armature and front contact to connection 285 extending to the switchboard for energizing the switchboard busy lamp 168 from battery 277, while at the same time the busy lamp 292 at the technical operator's position is also energized to the same ground from battery 302. Whenever an "east-west" busy indication is needed, an additional relay may be connected to terminal T–18 of the control terminal, and thus operated over this same circuit to ground including connection 285 and the TR–2 contacts of the TR relay. Thus operation of the PA relay puts the land-based transmitter on the air.

If a monitor receiver, such as 294 is used, its Codan relay 295 is wired up in such fashion as above explained that it normally keeps the monitoring relay MR, energized, and deenergizes this relay whenever the land transmitter carrier is received, provided its frequency falls within the acceptance band of the receiver. If no monitor receiver is employed, switch 298 is actuated, as explained, to connect its switch arm to contact 299, in which event the TR–2 contacts of the transmitter relay take over the function of the monitor receiver Codan relay. Actually no switch such as 298 is employed in the circuit, the connection in question being obtained by strapping terminals O–5 and O–6 on the option board 301, Fig. 10*a*. In any event the MR relay, upon releasing over either of the circuits aforesaid, following operation of the TR relay, interrupts at its MR–1 contact, the remaining holding circuit for the control terminal line relay LR, which thereupon releases and extinguishes the line lamps 167 and 291.

Insertion of the operator's cord plug 214 in jack 165, also operates the PB relay over its operating circuit above traced. The PB relay upon thus operating, applies ground through the PB–1 armature and front contact to the dialing lead 217 which controls the tone generated in the dial tone oscillators. As the circuit description under present consideration, applies only to the case of an incoming call, the control terminal line relay LR is energized when the operator inserts her cordplug 214 in the switchboard jack, so that the LR–3 armature, Fig. 10, of the LR relay is actuated against its lower or front contact, and hence the operating circuit for the vibrating relay VR, traced from battery 305 through the winding of this relay, the LR–3 armature and back contact of the LR relay, the MR-2 armature and front contact of the MR relay and the PB-1 front contact and armature of the PB relay to ground, is open at the LR-3 contacts of the LR relay. Consequently the application of ground to lead 306, Fig. 10, by operation of the PB relay, cannot energize the vibrating relay VR. Likewise subsequent release of the line relay LR, cannot energize the vibrating relay VR, under the conditions under consideration, because the LR relay cannot be released until after the MR relay has been released; and, whenever this occurs the circuit from lead 306 to the vibrating relay, is already interrupted at the MR-2 contacts of the MR relay. Referring to Fig. 10, it will be noted that an operating circuit for the super slow relay SS is traced from battery 307 through the winding of this relay to ground at 308 through the VR-2 armature and front contact of the VR relay and thence through its VR-1 contacts. Accordingly operation of the VR relay will energize the SS relay. However, as above noted the VR relay finds no operating circuit at this stage, and so long as the VR relay, and hence the SS relay, are released, even a subsequent release of the PB relay, cannot energize the VR relay, because its alternative operating circuit through the PB-1 back contact and armature of the PB relay, is open at the SS-3 front contact and armature of the SS relay, which latter, as above noted remains deenergized. Accordingly since the vibrating relay VR and the super slow relay SS remain deenergized, no ground will be applied to the transfer relay B, Fig. 9, over circuit 273 extending from battery 274 through the B relay winding and to ground through the SS-1 front contact and armature of the SS relay. Referring to Fig. 10 it will be noted that an operating circuit for the EA relay is traced from battery 309 through the winding of this relay thence through a switch 310 to ground at 311 through the SS-1 back contact and armature of the SS relay. Accordingly this relay is normally energized over this circuit, and since the SS relay does not operate at this stage, as above explained, the ground to the EA slow release relay is maintained. It will also be noted in Fig. 10 that an operating circuit for an EB relay is traced from battery 309 through the winding of this relay and thence to ground at 312 through the EA-2 front contact and armature of the EA relay, so that the EB relay is normally operated over this circuit and remains operated at this stage through the EA-2 front contact and armature of the EA relay. Still referring to Fig. 10 there is shown a switch 313 which in the non-actuated position shown connects lead 306 through the switch arms and connection 314 to lead 217 extending to the dial tone oscillators. If all mobile stations are equipped with station selectors in accordance with my applications aforesaid, switch 313 is maintained in the normal position shown, and the operator's cord plugged into jack 166, Fig. 9, to energize the X relay, and thus connect the dialing lead 17 to the pulsing relay PR of dial tone oscillator panel 151. If on the other hand the Western Electric Company type of station selector is employed for the mobile stations, switches 313, 310 and 320, Fig. 10, are actuated to connect lead 306 through the switch arms and upper and lower contacts respectively of switch 313, through the EA-1 and EB-1 contacts in series of the EB and EA relays and thence to the dialing lead 217. As above described however on answering an incoming call the EB and EA relays will remain unaffected, because the SS relay remains deenergized. It should be pointed out that actually no switches 313, 310, 320 are required in order to accomplish the aforesaid alternative connections, inasmuch as this may be done on the option board 301, Fig. 10a, in the first instance by strapping terminals O-3 to O-8, and in the second instance by connecting terminal O-7 to O-8, and connecting terminal O-3 to O-4.

*Outgoing calls.*—When the operator at the central office switchboard 164, Fig. 9, originates a call, the line relay LR in the control panel 150 is not energized. When the operator inserts her cord plug 214 in one of her jacks 165, 166, the PA and PB relays operate as above described. Operation of the PA relay energizes the TR relay, which switches on the outgoing carrier from the land-based transmitter, Fig. 5, as above described. Operation of the PB relay connects ground through its PB-1 armature and front contact to lead 217, through the PB-1 armature and front contact as above described, the application of this ground to lead 306 energizes the vibrating relay VR, over the circuit traced from battery 305, through the VR relay winding, through the LR-3 armature and back contact of the LR relay, which is now de-energized, thence through the MR-2 armature and front contact of the MR relay, which is still energized, as above explained, and thence to ground through the PB-1 front contact and armature of the PB relay. The vibrating relay VR is provided with a weighted-spring armature 315 which, upon energization of the VR relay, vibrates in damped, oscillatory fashion between the upper and lower VR-1 contacts of this relay, and in so vibrating also intermittently closes the VR-2 front contact and armature thereof. Accordingly, when the VR relay is energized as aforesaid, it energizes the super-slow relay SS over the circuit traced from battery 307, through the SS relay winding and thence to ground at 308 through the closing of the VR-2 contacts in series of the VR relay. Once the SS relay is thus energized, it closes an alternate energizing circuit which is traced through its SS-3 armature and front contact to ground at 308, through the VR-1 contacts of the vibrating relay VR. In this way the SS relay remains energized for a considerable period of time by the vibrating motion of the VR relay armature 315, which keeps applying ground pulses through its VR-1 contacts, the SS relay being slow-release in order to be held energized by this intermittent ground. Concurrently with energization of the PB relay, the PA relay is energized as above explained, to initiate the series of operations described above in connection with incoming calls, viz., the switching on of the outgoing carrier from the land-based transmitter by closing the operating circuit for the TR relay, and by opening the holding circuit for the monitor receiver relay MR, due either to energization of the Codan relay 295 of the monitor receiver 294, or to opening of the TR-2 contacts of the TR relay, depending on whether switch 298 is connected to the monitor receiver or to contact 299. As a result, the MR relay releases a short time after the PA relay is operated, and transfers, through its MR-2 contacts, the operating circuit for the VR relay from the front PB-1 contact of the PB relay to the back contact thereof, to the latter through the armature and MR-2 back contact of the MR-2 relay and the SS-3 front contact and armature of the SS relay, over a connection 316. When carrier from a mobile unit is subsequently received in one of the land-based receivers, it is to be noted that the aforesaid operation of the TR relay and release of the MR relay have opened both operating circuits for the control terminal line relay LR, so that this line relay cannot be operated. As was described above, the series of operations initiated by action of the PB relay has now closed the SS-3 front contact and armature of the SS relay. As a result, whenever the PB relay releases under the influence of dial pulses transmitted from the operator's dialing equipment 275, and thus correspondingly recloses the PB-1 back contact of the PB relay, the vibrator relay VR is energized anew through the PB-1 back contact and armature of the PB relay each time this relay is thus released, over the circuit above traced, which includes the LR-3 armature and back contact of the LR relay, the MR-2 armature and back contact of the MR relay, and the SS-3 front contact and armature of the SS relay. As a result, a new energizing pulse is applied to the vibrating relay each time a dial pulse is transmitted, and thus the vibratory motion of the VR relay armature 315 is rejuvenated for each dial pulse thus transmitted. This makes it possible to adjust the vibrating relay to a moderate time delay before its armature 315 ceases to vibrate, and yet to provide a means to maintain the vibration thereof throughout a complete series of dialing operations, and for a sufficient interval thereafter to provide a ringing interval on a mobile station call.

A third contact SS-1, Fig. 9, on super-slow relay, applies ground to lead 273 to energize the transfer relay B from battery 274, which switches the land-based transmitter input circuit 177 from the limiting amplifier output circuit 176, to the dialing circuit 178 through the B-1 contacts of the B relay; while concurrently removing the short across the shunt arm 180 of the T-pad attenuator 179 through the B-2 contacts of the B relay. The T-pad accordingly transmits dialing tone to the switchboard operator over circuits 173, 173 to inform the operator that the circuit is ready for dialing, it being understood that the operator now has her cord plug 214 inserted in one of the jacks 165, 166, and has her telephone set 317 connected to the cord circuit 215 to listen to this tone. If the mobile stations are equipped exclusively with station selectors in accordance with my applications aforesaid, the G. T. oscillator of panel 151 is sued exclusively for dialing, in which case switch 313 of Fig. 10 is left in the position shown while switches 310 and 320 are left open, as shown in the drawing. Actually this amounts to strapping the option board terminal O-3 to O-8 while leaving terminals O-1, O-2, O-11 and O-12 open. In this case the dialing lead 217 is under direct control of the PB-1 contacts of the PB relay, and dialing pulses will interrupt the dial tone from oscillator 152 by operation of the pulsing relay PR of panel 151. At each such dialing interruption, the VR relay is energized as aforesaid. As long as the VR relay continues to vibrate and thus keeps the SS relay energized, its SS-1 contact will apply ground to connection 273, Fig. 9, thus to keep the transfer relay energized, and the dial tone circuit 178 connected to the input 177 of the land-based transmitter circuit. After the last dialing pulse, the vibrating armature 315 of the VR relay takes about two seconds to die down and open the SS-1 contact of the SS relay, by release of the latter, thus to disconnect the dial tone circuit 179 from the transmitter input circuit 177. This leaves the dial tone applied to the transmitter input circuit for an adequate bell ringing period.

The Western Electric Company selector 106-A, requires a separate pulse at the beginning of each group of dialing operations in order to select the mobile station to be called, this separate pulse being required in order to reset the mobile station selector to zero at the beginning of the dialing operation, and it likewise requires an additional pulse at the end of each dialing and bell ringing period, in order to release the bell ringing circuit. In order to introduce these additional pulses, where station selection is to be effected by means of the Western Electric Company oscillator of panel 154, switch 313, Fig. 10, is thrown to the right to insert between leads 306 and 217 the EA-1 and EB-1 contacts in series of the EB and EA relays, in addition to which switches 310 and 320, Fig. 10, are closed. Actually this amounts to making the following strapping connections on the option board 301 of Fig. 10*a*, viz., connecting terminal O-7 to O-8, connecting terminal O-3 to O-4, connecting terminal O-1 to O-2 and connecting terminal O-11 to O-12. With the circuit of Fig. 10 as thus modified, application of ground to lead 306 through the PB-1 armature and front contact, will originally apply this ground to the dial lead through the EA-1 and EB-1 armatures and front contacts in series. Shortly after relay PB has applied ground to connection 306 through its PB-1 armature and front contact, the super slow relay SS will energize as aforesaid, and through its SS-1 back contact, remove ground from the EA relay. The EA relay being slow release will shortly thereafter open it contacts EA-1 which in turn removes ground from the dialing lead 217. Also through the EA-2 contacts of the EA relay, the energizing circuit for the EB relay releases, and closes a new ground circuit through the EA-1 and EB-1 armatures and back contacts. The time between the release of the EA and EB relays provides the necessary additional pulse above referred to.

At the end of the dialing period, the SS relay remains operated for a short period under control of the VR relay as aforesaid. This maintains the dial tone applied to the land-based transmitter for maintaining the bell ringing at the called mobile station for a desired interval. After this "bell ringing period" the SS relay releases, and in so doing energizes the EA relay through the SS-1 back contact and armature. Energization of the EA relay opens the circuit through the back contacts EA-1 and EB-1. Meantime the energizing circuit for the EB relay is reclosed through the EA-2 front contact and armature of the EA relay. As the EB relay is released however its EB-2 contacts, remove ground from lead 321, Fig. 10, so that the energizing current of the EB relay is reduced due to the use of the alternative ground 312 obtained through the resistance 322, having a value of approximately 2500 ohms. As a result some time elapses before the EB relay energizes and recloses the circuit from lead 306 to the dialing lead 217. This time delay in the operation of the EB relay provides the additional pulse which is necessary to "clear" the mobile station selector, and thus to interrupt the bell signal.

It is necessary however that this last pulse be transmitted before the transfer relay B has disconnected the signal oscillators of panel 213 from the transmitter input circuit 177. For this purpose the SS-1 contact of the SS relay, is paralleled to ground by the EB-2 contacts of the EB relay, thus to keep the transfer relay energized until the EB relay is reenergized. As this constitutes the termination of the clearing impulse, the tone oscillators may now be disconnected from the transmitter circuit, which is effected when the EB relay reenergizes to remove the last ground from the transfer relay lead 273 at the EB-2 contacts of this relay.

When some of the mobile stations are equipped with the Western Electric Company type 106-A selector, while others are equipped with those in accordance with my applications aforesaid, the circuit of Fig. 10 is wired in the same manner as for stations equipped only with Western Electric Company station selectors. That is to say, switch 313, Fig. 10, is thrown to the right, and switches 319 and 320 are closed. In this case the extra pulse at the beginning and end of dialing operations will have no effect on mobile station selectors in accordance with my applications aforesaid.

With respect to clearing of the dialing circuit, some time after the dialing is completed in a system employing station selectors in accordance with my applications aforesaid, exclusively, or otherwise after the clearing pulse has been sent out at the end of the bell ringing cycle in systems employing Western Electric Company selectors, as well as in "mixed" systems, the super slow relay SS releases and energizes the EB relay thus removing the ground from the transfer relay lead 273, which in turn releases the transfer relay. This operation removes the tone oscillators from the input 177 to the land-based transmitter, and instead connects it to the speech output of the limiting amplifier through the B-1 armature and back contact of the B relay. When the mobile station subscriber answers the call, conversation will now proceed in normal fashion.

*Release of system.*—If a call is terminated short of completion, or if a called station does not answer, the operator removes her cordplug 214 from the switchboard jacks. This releases the PA relay, which in turn opens at its PA-1 contacts the energizing circuit for the TR relay which releases, and thus switches off the land-based transmitter by opening the energizing circuit therefore traced from battery 272 to lead 271 through the TR-1 contacts of the TR relay. When the land transmitter is thus switched off the Codan relay 295 of the monitor receiver 294 releases, if a monitor receiver is employed, and thus re-energizes the monitor receiver relay MR. Otherwise release of the TR relay energizes through its TR-2 contacts the MR relay. Also release of the TR relay extinguishes the busy lamps 168 and 299 by opening at its TR-2 contacts the energizing circuits for these lamps. Release of the TR relay and accompanying energization of the MR relay as aforesaid, closes the TR-3 and MR-1 contacts of the LR relay circuit, thus preparing the line relay for later incoming or outgoing calls. The super slow relay SS has already been released as explained and the transfer relay restored to normal, the release of the PB relay does not, through its PB-1 contacts, control any new functions beyond removing the drive to the final amplifier of the G. T. oscillator circuit, Fig. 11, which moreover was already disconnected from the transmitter, by release of the transfer relay.

*Special circuits.*—As was explained above the control panel is so equipped that the technical operator may operate the complete system from the control terminal after disconnecting the switchboard appearances. This is accomplished by means of the two gang switches S-3 and S-4, Fig. 10. The first switch, S-3, is a two-position switch which, in the normal position as shown in Figs. 9 and 10, connects all the switchboard circuits straight through to the central office switchboard, as described above. However, when this switch S-3 is thrown to the "technical operator's" position, all circuits into the central office switchboard 164 are disconnected and connected instead to the technical operator's position 287, through contacts of the second gang switch S-4. In order for the technical operator to take over all operations normally performed by the central office switchboard operator, the technical operator is provided with, in addition to gang switch S-4, a dialing equipment 325, a pair of jacks 326 and 327, and a handset 328, including a microphone transmitter 329 and a telephone receiver 330, each terminating in plugs 331, 332, respectively, for insertion in jacks 326, 327, respectively. The gang switch S-4 is a three-position switch having "off," "monitor" and "talk" positions, for controlling all operations to be performed by the technical operator when he takes over the central office operator's functions. Thus, with the gang switch S-3 thrown to the technical operator's position, and with gang switch S-4 thrown to the "talk" position, and with the technical operator's handset 328 plugged into jacks 326, 327, the technical operator's handset is connected through a transformer T-2 and over a circuit comprising conductors 333, 334, to circuit 175, through the now-closed contacts 335, 336 of gang switch S-4 and contacts 288 of gang switch S-3. It will be noted, in this connection, that transformer T-2 is a four-winding transformer having a pair of primary windings 337, 338 connected in series between the tip conductors of jacks 326, 327, through a condenser 339, the latter interconnecting the inner terminals of these transformer windings. Also, it will be observed that the inner terminal of winding 338 is grounded at 340. The secondary windings 341 and 342 of the transformer are connected in series across conductors 333, 334, with the inner terminals of these transformer windings inter-connected by condenser 343, across which condenser the dialing equipment 325 is bridged through a current-limiting resistor 344. Thus, with the circuit arranged as above stated, the technical operator's microphone 329 will be energized with direct current supplied from battery 345 through a current-limiting resistor Y contacts 346 of gang switch S-4, and over a connection 347, thence through winding 337 of transformer T-2, and through the technical operator's microphone transmitter 329 to ground at 340. Likewise, current will flow through the dialing equipment 325, this current being supplied from battery 348 at transformer T-1, through the winding of the PA relay, thence through winding 266 of transformer T-1, through the lower armature and upper contact of the gang switch S-3, thence over conductor 334 and through winding 342 of transformer T-2, thence through the dialing equipment 325, returning through winding 341 of transformer T-2, and over conductor 333 through contacts 335, 336 of gang switch S–4 and the upper contact and upper armature of gang switch S–3, and through winding 265 of transformer T–1, to ground through the PB relay. The PB and PA relays will accordingly be energized to arrange the control terminal system for dialing in the same manner as above described for dialing from the central office switchboard 164, except that in this instance, the dialing pulses will be transmitted by actuation of the technical operator's dialing equipment 325. From this point on, a call is put through by the technical operator, in the same manner as above described for the central office operator. When the call is completed, all circuits are cleared by the technical operator restoring the S–4 switch to the "off" position or by his removing his handset 328 from switchboard jacks 326, 327, thus to release the PA and PB relays. The monitor position of gang switch S–4 may be used when gang switch S–3 is in either the normal or technical operator's position, so that the technical operator may, by inserting his handset in jacks 350, monitor on a call, irrespective of whether or not the call is being handled from the central office switchboard or from the technical operator's position. To this end, the tip conductors of jacks 351 are bridged by the primary winding 351 or a high-impedance, isolating transformer T–3, the midpoint of which is connected over 352 to the sleeves of jacks 350 in multiple. The secondary winding 353 of transformer T–3 is connected at each end between upper and lower pairs of stationary contacts 354 and 355 of gang switch S–4, to the corresponding, movable switch arms 356 of which, connections 357 extend respectively to the upper and lower conductors of circuit 175. Thus, monitoring is effected irrespective of the position of gang switch S–3, and irrespective of whether gang switch S–4 is in the "monitoring" or "talk" position. However, the monitoring transformer T–3 is disconnected and locked in the "off" position.

A single push-button switch 358 is incorporated in the control panel, to simulate an incoming call for testing purposes. This push-button circuit comprises a grounded, lower contact of switch 358, the movable switch arm of which is connected over conductor 359 and through an upper contact and switch arm 360 of gang switch S–3, to connection 270, extending to the control terminal, receiver line panel 158, Fig. 9. Thus, by actuating the push-button 358 with the gang switch S–3 in the technical operator's position, an incoming call may be simulated, since the ground at push-button switch 358 simulates the function of a Codan relay in a land-based receiver circuit, as above described.

If a frequency monitor is employed at the land-based transmitter, a ground is applied to connection 278, as above described, whenever the land-based transmitter is switched on but is operating "off frequency." This ground is applied from connection 278 through the TR–4 armature and front contact of the TR relay, to the "off frequency" lamp 361 at the technical operator's position, which is thus energized from battery 362 connected thereto. It is also applied through contacts of switches S–5 and S–6, to a station alarm bell 363, energized from a battery 364 to energize the same. If the gang switch S–3 is in the normal position, an "off frequency" indication is also provided at the central office "off frequency" lamp 279, but the operating circuit for this lamp is disconnected when switch S–2 is in the technical operator's position.

What I claim is:

1. In a carrier current communication system: a carrier current receiver including a receiver relay responsive to incoming carrier; a carrier current transmitter including a power relay for switching on outgoing carrier; a control terminal remote from said transmitter and receiver, and metallic circuits connecting the same with said receiver and transmitter respectively, said control terminal including a line relay and a transmitter relay; means responsive to carrier current incoming to said receiver and including said receiver and line relays, for energizing a line lamp; means including a manually actuated switching means for energizing said transmitter relay; means responsive to energization of said transmitter relay for energizing said power relay to switch on carrier outgoing from said transmitter and for releasing said line relay to extinguish said line lamp; a dial tone oscillator including a dialing relay; a vibrating relay, a slow-release relay, a transfer relay and a dialing device; means including said manual switching means and contacts of said line relay for energizing said vibrating and slow-release relays; means responsive to energization of said slow-release relay for energizing said transfer relay to connect said dial tone oscillator to said transmitter circuit; and means including said dialing device and a pulsing relay for thereafter energizing said dialing relay in accordance with dialing pulses.

2. In a carrier current communication system: a carrier current receiver including a receiver relay responsive to incoming carrier; a carrier current transmitter including a power relay for switching on outgoing carrier; a control terminal connected over metallic circuits to said receiver and transmitter respectively, said control terminal including line, transmitter, pulsing, vibrating, slow-release and transfer relays; means including said receiver and line relays for energizing a line lamp in response to carrier incoming to said receiver; means including a manual switching device for energizing said transmitter relay; means responsive to energization of said transmitter relay for extinguishing said line lamp and energizing said power relay; a dial tone oscillator including a dialing relay; means including said switching device and said vibrating and slow-release relays for energizing said transfer relay to connect said dial tone oscillator to said transmitter circuit; means including a dialing device and a pulsing relay for energizing said dialing relay in accordance with dialing pulses; and means including said pulsing and slow-release relays for re-energizing said vibrating relay each time said pulsing relay releases during dialing thereby to maintain said transfer relay energized for the duration of said dialing and for a preselected interval thereafter.

3. In a carrier current signaling system: a carrier receiver including a receiver relay responsive to incoming carrier, a carrier transmitter including a power relay for switching on outgoing carrier; metallic circuits connecting said receiver and transmitter to a control terminal, and thence over a common metallic circuit to a central office switchboard jack; line and busy lamps adjacent said jacks; said control terminal including line, pulsing and transmitter relays; means including said receiver and line relays for energizing said line lamp in response to carrier incoming to said receiver; means responsive to insertion of an operator's cord circuit plug in said jack for energizing said transmitter relay; means including said transmitter relay and said transmitter metallic circuit for energizing said power relay to switch on said transmitter, for releasing said line relay to extinguish said line lamp, and for energizing said busy lamp; a dial tone oscillator including a dialing relay; a dialing device in the operator's cord circuit, and a transfer relay; means including back contacts of said line relay and contacts of said pulsing relay for energizing said transfer relay in response to insertion of said cord plug in said jack; means responsive to energization of said transfer relay for connecting said dial tone oscillator to said transmitter circuit; and means including said pulsing and dialing relays for thereafter modulating said transmitter carrier with said dial tone in accordance with dialing operations of said dialing device.

4. In a carrier current communication system: a carrier receiver including a receiver relay responsive to incoming carrier; a carrier transmitter including a power relay for switching on outgoing carrier; a control terminal including a line and a transmitter relay; a metallic circuit extending from said control terminal to a central office switchboard; a line lamp thereat; said central office metallic circuit being connected over a metallic circuit to said receiver, and being further connected through a limiting amplifier and through back contacts of a transfer relay to a metallic circuit extending to said transmitter; an operator's cord circuit including a plug and a dialing device; a dial tone oscillator including a dialing relay; means responsive to insertion of said plug in said jack, for energizing said transmitter relay; means responsive to energization of said transmitter relay for releasing said line relay to extinguish said line lamp, and for energizing said power relay to switch on said outgoing carrier; means including a pulsing relay responsive to insertion of said plug in said jack, for energizing said transfer relay to disconnect said limiting amplifier from said transmitter circuit and for connecting said dial tone oscillator thereto; and means including said dialing device and said pulsing and dialing relays, for thereafter modulating the transmitter carrier in accordance with dialing pulse actuations of said dialing device.

5. In a carrier current communication system: a carrier receiver including a receiver relay responsive to incoming carrier; a carrier transmitter including a power relay for switching on outgoing carrier; a control terminal including a line relay and a transmitter relay; a metallic circuit extending from said control terminal to a central office switchboard, a line lamp, a busy lamp and an off-frequency alarm device thereat; said central office metallic circuit being connected over a metallic circuit to said receiver, and being further connected through a limiting amplifier and through back contacts of a transfer relay to a metallic circuit extending to said transmitter; an operator's cord circuit including a plug and a dialing device; a dial tone oscillator including a dialing relay; means including said receiver and line relays, responsive to carrier current incoming to said receiver for energizing said line lamp; means responsive to insertion of said plug in said jack for energizing said transmitter relay; means responsive to energization of said transmitter relay for releasing said line relay to extinguish said line lamp, for energizing said busy lamp, and for energizing said power relay to switch on said transmitter outgoing carrier; a pulsing relay responsive to insertion of said plug in said jack; means including back contacts of said line relay and contacts of said pulsing relay for energizing said transfer relay in response to insertion of said plug in said jack; means responsive to energization of said transfer relay for connecting said dial tone oscillator to said transmitter circuit and for disconnecting said limiting amplifier therefrom; means including said pulsing and said dialing relays for thereafter modulating said transmitter carrier with said dial tone in accordance with dialing operations of said dialing device; and means including a frequency monitor at said transmitter, responding to off-frequency operation of said outgoing carrier, for energizing said off-frequency alarm device at said switchboard.

6. In a carrier current communication system: a carrier transmitter, including a power relay for switching on outgoing carrier; a metallic transmitter circuit connecting said transmitter to a control terminal; a dialing circuit thereat including a pulsing relay and a dialing device connectible thereto; a dial tone oscillator, including a dialing relay; a transfer relay having contacts for connecting said dial tone oscillator to said transmitter circuit; a vibrating relay having a weighted armature which vibrates in damped, oscillatory fashion upon energization of said relay; a slow-release relay and a transmitter relay; means responsive to connection of said dialing device to said dialing circuit for energizing said pulsing and transmitter relays; means responsive to energization of said transmitter relay for energizing said power relay; means responsive to energization of said pulsing relay for energizing said vibrating relay; means responsive to energization of said vibrating relay for energizing said slow-release relay; means responsive to energization of said slow-release relay for energizing said transfer relay; means including said pulsing and dialing relays thereafter responding to said dialing device for modulating said outgoing carrier in accordance with dialing interruptions of said dial tone oscillator; and means including front contacts of said slow release relay and back contacts of said pulsing relay for re-energizing said vibrating relay each time said pulsing relay releases in response to dialing interruption of said dialing device.

7. In a carrier current communication system: a control terminal; a first circuit thereat, including a pulsing relay responsive to dialing pulses and a dialing device connectible to said circuit; a second circuit coupled to the first and extending to a remote carrier receiver, and a third circuit coupled to the first and extending through a limiting amplifier to a remote carrier transmitter; said control terminal also including line, transmitter and transfer relays, a dial tone oscillator, and line and busy lamps; means including said line relay responsive to carrier current incoming to said receiver for energizing said line lamp; means responsive to connection of said dialing device to said first circuit for energizing said pulsing and transmitter relays; means responsive to energization of said transmitter relay for releasing said line relay to extinguish said line lamp, for energizing said busy lamp and for switching on carrier outgoing from said transmitter; means including release contacts of said line relay and responsive to energization of said pulsing relay for energizing said transfer relay to connect said tone oscillator to said first and third circuits; and means including said pulsing relay thereafter responding to actuation of said dialing device for modulating said outgoing carrier in accordance with dialing interruptions of said dial tone.

8. In a carrier current communication system: a control terminal; a first circuit thereat, including a pulsing relay responsive to dialing pulses, and a dialing device connectible to said circuit; a second circuit coupled to the first and extending to a remote carrier receiver having therein a receiver relay responsive to incoming carrier signals; a third circuit coupled to the first and extending through a limiting amplifier and through release contacts of a transfer relay to a remote carrier transmitter having therein a power relay for switching on the outgoing carrier; said control terminal also including line and transmitter relays, a dial tone oscillator, and line and busy lamps; means including said receiver and line relays, responsive to carrier current incoming to said receiver for energizing said line lamp; means responsive to connection of said dialing device to said first circuit for energizing said pulsing and transmitter relays; means responsive to energization of said transmitter relay for releasing said line relay to extinguish said line lamp, for energizing said busy lamp, and for energizing said power relay to switch on carrier outgoing from said transmitter; means including release contacts of said line relay and responsive to energization of said pulsing relay, for energizing said transfer relay to connect said tone oscillator to said first and third circuits while disconnecting said limiting amplifier from said third circuit; and means including said pulsing relay and said dialing device for thereafter modulating said outgoing carrier with said dial tone in accordance with dialing pulse interruptions of said dialing device.

9. In a carrier current communication system: a control terminal; a first circuit thereat, including a pulsing relay responsive to dialing pulses, and a dialing device connectible to said circuit; a second circuit coupled to the first and extending to a remote carrier receiver; a third circuit coupled to the first and extending through a limiting amplifier to a remote carrier transmitter; said control terminal also including a line relay, a transmitter relay, a transfer relay, a vibrating relay having a weighted armature which vibrates in damped, oscillatory fashion upon energization of said relay, a slow-release relay, a dial tone oscillator including a dialing relay, a line lamp and a busy lamp; means including said line relay, responsive to carrier current incoming to said receiver, for energizing said line lamp; means responsive to connection of said dialing device to said first circuit, for energizing said pulsing and transmitter relays; means responsive to energization of said transmitter relay for releasing said line relay to extinguish said line lamp, for energizing said busy lamp, and for switching on carrier outgoing from said transmitter; means including release contacts of said line relay and responsive to energization of said pulsing relay, for energizing said vibrating relay; means responsive to energization of said vibrating relay, for energizing said slow-release relay; means responsive to energization of said slow-release relay for energizing said transfer relay; means responsive to energization of said transfer relay, for connecting said tone oscillator to said first and third circuits and for disconnecting said limiting amplifier from said third circuit; means including said pulsing and dialing relays and said dialing device, for thereafter modulating said outgoing carrier with said dial tone in accordance with dialing pulse interruptions of said dialing device; and means including front contacts of said slow-release relay and back contacts of said pulsing relay, for re-energizing said vibrating relay each time said pulsing relay releases in response to dialing interruptions of said dialing device.

10. In a carrier current communication system: a transmitting station including a carrier current transmitter and a frequency monitor, the latter including a contacting galvanometer; a control terminal remote therefrom; a two-wire metallic circuit extending from said control terminal to said transmitting station; means including transformers interposed in said circuit at said control terminal and at said transmitting station respectively, for providing electrically separate voice frequency transmission and direct current signaling circuits over said metallic circuit, said means also including line relays at said control terminal and transmitting stations respectively; means including a transmitter relay at the control terminal, together with one of said metallic circuit conductors and said line relay at the transmitter station, for remotely energizing said transmitter to switch on outgoing carrier; and means including said frequency monitor contacting galvanometer, the remaining conductor of said metallic circuit and the line relay at the control terminal, for energizing an alarm device at the control terminal in response to off-frequency operation of said transmitter.

11. In a carrier current communication system: a receiving station, including normal and standby carrier current receivers; a two-wire, metallic circuit extending from said station to a control terminal remote therefrom; means including transformers interposed in said metallic circuit at said control terminal and at said receiving station, respectively, for providing electrically separate voice transmission and direct current signaling circuits over said metallic circuit, said means also including line relays at said control terminal and receiving station, respectively; means including a switch at said control terminal, together with one of said metallic circuit conductors and the said line relay at the receiving station, for remotely disconnecting said normal receiver from said metallic circuit, and for connecting said standby receiver thereto; and means including a carrier relay in each of said receivers, the remaining conductor of said metallic circuit, and the said line relay at the control terminal, for energizing a signaling device in the control terminal in response to carrier current incoming to the receiver connected to said metallic circuit.

12. In a carrier communication system: a carrier receiver, including a carrier receiver relay, a carrier transmitter, including a carrier switch-on relay; circuits connecting the same with a control terminal; a line relay thereat; an operating circuit therefor, including a back contact of a transmitter relay and a front contact of a normally energized monitor relay, and a front contact of said carrier receiver relay; means for energizing said transmitter relay, including a dialing loop and a dialing device connectible thereto; means including said transmitter relay, for energizing said carrier switch-on relay; a dial tone oscillator including a dialing relay;

means for energizing said dialing relay in accordance with dialing pulses, said means including said dialing device and a pulsing relay in said dialing loop; means for connecting said dial tone oscillator to said transmitter circuit for a dialing interval and for a subsequent ringing interval, on outgoing calls, while maintaining said oscillator circuit disconnected from said transmitter circuit on incoming calls, said means including a vibrating relay having a spring-weighted armature vibratile between front and back contacts; an energizing circuit for said vibrating relay, including a back contact of said line relay, and front contacts in series of said monitor and pulsing relays; a re-energizing circuit for said vibrating relay at the end of each dialing pulse, including a back contact of said line relay, a back contact of said monitor relay, a front contact of a slow-release relay and a back contact of said pulsing relay; an energizing circuit for said slow-release relay, including contacts of said vibrating relay, and a holding circuit therefor, including a front contact of said slow-release relay and contacts of said vibrating relay; and a transfer relay responsive to energization of said slow-release relay to connect said dial tone oscillator to said transmitter circuit.

13. In a carrier communication system: a carrier receiver including a carrier relay, a carrier transmitter including a carrier switch-on relay; circuits connecting said receiver and transmitter to a control terminal; a line relay thereat; an operating circuit therefor, including a front contact of said carrier relay, together with back and front contacts in parallel of, respectively, a transmitter relay and a monitor relay; a locking circuit for said line relay including said monitor and transmitter relay contacts; a signaling device responsive to energization of said line relay; means for energizing said transmitter relay, including a dialing loop and a dialing device connectible thereto; means responsive to energization of said transmitter relay, for energizing said carrier switch-on relay and for releasing said monitor relay; a dial tone oscillator circuit including a dialing relay; means for energizing said dialing relay in accordance with dialing pulses, said means including said dialing device and a pulsing relay in said dialing loop; means for connecting said dial tone oscillator to said transmitter circuit for a dialing interval and for a subsequent ringing interval on outgoing calls, while maintaining said oscillator circuit disconnected from said transmitter circuit on incoming calls, said means including a vibrating relay having a spring-weighted armature vibratile between front and back contacts; an energizing circuit therefor, including in series, a back contact of said line relay and front contacts of said monitor and pulsing relays; a re-energizing circuit for said vibrating relay at the end of each dialing pulse, including back contacts of said line and monitor relays, a front contact of a slow-release relay and a back contact of said pulsing relay; an energizing circuit for said slow-release relay, including contacts of said vibrating relay, and a holding circuit therefor, including a front contact of said slow-release relay and contacts of said vibrating relay; a transfer relay responsive to energization of said slow-release relay; and means responsive to energization of said transfer relay, for connecting said dial tone oscillator circuit to said transmitter circuit, for the vibrating duration of said vibrating relay.

14. In a carrier communication system: a carrier receiver including a carrier relay; a carrier transmitter including a carrier switch-on relay; circuits connecting said receiver and transmitter to a control terminal; a line relay thereat; an operating circuit therefor, including a front contact of said carrier relay, together with back and front contacts in parallel of, respectively, a slow-release transmitter relay and a slow-release monitor relay; a locking circuit for said line relay including said parallel monitor and transmitter relay contacts; a signaling device responsive to energization of said line relay; means for energizing said transmitter relay including a dialing loop, a supervision relay therein, and a dialing device connectible to said loop; means responsive to energization of said transmitter relay, for energizing said carrier switch-on relay, and for releasing said monitor relay; a dial tone oscillator circuit including a dialing relay; means for energizing said dialing relay in accordance with dialing pulses, said means including said dialing device, and a pulsing relay in said dialing loop; means for connecting said dial tone oscillator to said transmitter circuit for a dialing interval and for a subsequent ringing interval, on outgoing calls, while maintaining said oscillator circuit disconnected from said transmitter circuit on incoming calls, said means including a vibrating relay having a spring-weighted armature, vibratile between front and back contacts; an energizing circuit therefor including in series, a back contact of said line relay and front contacts of said monitor and pulsing relays; a re-energizing circuit for said vibrating relay at the end of each dialing pulse, including in series, back contacts of said line and monitor relays, a front contact of a slow-release relay and a back contact of said pulsing relay; an energizing circuit for said slow-release relay, including the armature and contacts of said vibrating relay, and a holding circuit for said slow-release relay, including a front contact thereof and the armature and contacts of said vibrating relay; a transfer relay responsive to energization of said slow-release relay; and means responsive to energization of said transfer relay, for connecting said dial tone oscillator circuit to said transmitter circuit.

15. In a carrier communication system: a carrier receiver, including a carrier receiver relay; a carrier transmitter, including a carrier switch-on relay; circuits connecting the same with a control terminal; a line relay thereat; an operating circuit therefor including said carrier receiver relay, and contacts of a slow-release, transmitter relay; means for energizing said transmitter relay, including a dialing loop containing a supervision relay and a dialing device connectible thereto; means including said transmitter relay for energizing said carrier switch-on relay; a dial tone oscillator including a dialing relay; means for energizing said dialing relay in accordance with dialing pulses, said means including said dialing device and a pulsing relay in said dialing loop; means for connecting said dial tone oscillator to said transmitter circuit for a dialing interval and for a subsequent ringing interval, on outgoing calls, while maintaining said oscillator circuit disconnected from said transmitter circuit on incoming calls, said means including a vibrating relay having a spring-weighted armature, vibratile between front and back contacts; an energizing circuit for said vibrating relay, including a back contact of said line relay, and a front contact of said pulsing relay; a re-energizing circuit for said vibrating relay at the end of each dialing pulse, including a back contact of said line relay, and a front contact of a slow-release relay and a back contact of said pulsing relay; an energizing circuit for said slow-release relay, including the armature and contacts of said vibrating relay, and a holding circuit therefor, including a front contact thereof and the armature and contacts of said vibrating relay; and a transfer relay responsive to energization of said slow release relay, for connecting said dial tone oscillator circuit to said transmitter circuit.

16. In a carrier communication system: a carrier receiver, including a carrier receiver relay, a carrier transmitter, including a carrier switch-on relay; circuits connecting the same with a control treminal; a line relay thereat; an operating circuit therefor, including a back contact of a transmitter relay and a front contact of a normally energized monitor relay, and a front contact of said carrier receiver relay; means for energizing said transmitter relay, including a dialing loop and a dialing device connectible thereto; means including said transmitter relay, for energizing said carrier switch-on relay; a dial tone oscillator including a dialing relay; means for energizing said dialing relay in accordance with dialing pulses, said means including said dialing device and a pulsing relay in said dialing loop; means for connecting said dial tone oscillator to said transmitter circuit for a dialing interval and for a subsequent ringing interval, on outgoing calls, while maintaining said oscillator circuit disconnected from said transmitter circuit on incoming calls, said means including a vibrating relay having a spring-weighted armature vibratile between front and back contacts; an energizing circuit for said vibrating relay, including a back contact of said line relay, and front contacts in series, of said monitor and pulsing relays; a re-energizing circuit for said vibrating relay at the end of each dialing pulse, including a back contact of said line relay, a back contact of said monitor relay, a front contact of a slow-release relay and a back contact of said pulsing relay; an energizing circuit for said slow-release relay, including contacts of said vibrating relay, and a holding circuit therefor, including a front contact of said slow-release relay and contacts of said vibrating relay; a transfer relay responsive to energization of said slow-release relay for connecting said dial tone oscillator circuit to said transmitter circuit; and means responsive to said connection for transmitting an initial dial tone interruption to said carrier transmitter prior to dialing, and a similar interruption subsequent to dialing, said means comprising a pair of slow-release, extra pulse relays, alternative energizing circuits for said dialing relay in response to energization of said pulsing relay including respectively, front and back contacts in series, of said extra pulse relays, an energizing circuit for a first said extra pulse relay including a back contact of said slow-release relay, an energizing circuit for the second extra pulse relay including a front contact of the first said extra pulse relay, and a holding circuit for said transfer relay including a back contact of the second said extra pulse relay.

17. In a carrier communication system: a carrier receiver, including a carrier receiver relay; a carrier transmitter, including a carrier switch-on relay; circuits connecting the same with a control terminal; a line relay thereat; an operating circuit therefor including said carrier receiver relay, and contacts of a slow-release, transmitter relay; means for energizing said transmitter relay, including a dialing loop containing a supervision relay and a dialing device connectible thereto; means including said transmitter relay for energizing said carrier switch-on relay; a dial tone oscillator including a dialing relay; means for energizing said dialing relay in accordance with dialing pulses, said means including said dialing device and a pulsing relay in said dialing loop; means for connecting said dial tone oscillator to said transmitter circuit for a dialing interval and for a subsequent ringing interval, on outgoing calls, while maintaining said oscillator circuit disconnected from said transmitter circuit on incoming calls, said means including a vibrating relay having a spring-weighted armature, vibratile between front and back contacts; an energizing circuit for said vibrating relay, including a back contact of said line realy, and a front contact of said pulsing relay; a re-energizing circuit for said vibrating relay at the end of each dialing pulse, including a back contact of said line relay, a front contact of a slow-release relay and a back contact of said pulsing relay; an energizing circuit for said slow-release realy, including the armature and contacts of said vibrating relay, and a holding circuit therefor, including a front contact thereof and the armature and contacts of said vibrating relay; a transfer relay responsive to energization of said slow-release relay, for connecting said dial tone oscillator circuit to said transmitter circuit; and means responsive to said connection for transmitting an initial dial tone interruption to said carrier transmitter prior to dialing and a similar interruption subsequent to dialing, said means comprising a pair of extra slow-release pulse relays, alternative energizing circuits for said dialing relay in response to energization of said pulsing relay including respectively, front and back contacts in series, of said extra pulse relays, an energizing circuit for a first said extra pulse relay including a back contact of said slow-release relay, an energizing circuit for the second extra pulse relay including a front contact of the first said extra pulse relay, and a holding circuit for said transfer relay including a back contact of the second said extra pulse relay.

EVERHARD H. B. BARTELINK.

REFERENCES CITED

The following references are of record in the file of this patent:

UNITED STATES PATENTS

| Number | Name | Date |
|---|---|---|
| 2,064,958 | Taylor | Dec. 22, 1936 |
| 2,265,056 | Bowers | Dec. 2, 1941 |
| 2,475,675 | Peterson | July 12, 1949 |
| 2,523,914 | Molnar | Sept. 26, 1950 |